(12) United States Patent
Shirota

(10) Patent No.: US 7,110,187 B2
(45) Date of Patent: Sep. 19, 2006

(54) ZOOM LENS AND ELECTRONIC IMAGING APPARATUS USING THE SAME

(75) Inventor: Eiji Shirota, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/254,775

(22) Filed: Oct. 21, 2005

(65) Prior Publication Data

US 2006/0181782 A1    Aug. 17, 2006

(30) Foreign Application Priority Data

Feb. 16, 2005    (JP)    ............................. 2005-039454

(51) Int. Cl.
   *G02B 15/14*    (2006.01)
(52) U.S. Cl. ...................... 359/689; 359/680
(58) Field of Classification Search ................ 359/689, 359/680–683, 686, 676, 781, 761
   See application file for complete search history.

(56) References Cited

U.S. PATENT DOCUMENTS

| 6,307,685 B1 | 10/2001 | Mori et al. ................. 359/690 |
|---|---|---|
| 6,646,815 B1 | 11/2003 | Nobe .......................... 359/689 |
| 6,856,467 B1 | 2/2005 | Iyama ......................... 359/682 |
| 6,900,947 B1 * | 5/2005 | Nakatani et al. ............. 359/689 |
| 6,972,908 B1 * | 12/2005 | Noda .......................... 359/680 |
| 6,999,242 B1 * | 2/2006 | Nanba et al. ................ 359/689 |

FOREIGN PATENT DOCUMENTS

JP    2002-372667    12/2002

* cited by examiner

*Primary Examiner*—Scott J. Sugarman
*Assistant Examiner*—M. Hasan
(74) *Attorney, Agent, or Firm*—Kenyon & Kenyon LLP

(57) ABSTRACT

A zoom lens in which when the magnification is changed in the range from a wide-angle position to a telephoto position in infinite object point focusing, spacing between a first lens unit, with negative refractive power as a whole, having a negative lens and a positive lens, and a second lens unit, with positive refractive power as whole, having a positive lens and a cemented lens component constructed with a positive lens and a negative lens, is narrowed and spacing between the second lens unit and a third lens unit, a single positive lens component, is widened, and the zoom lens satisfies the following condition: $2.1 < |\beta_{2T}| < 2.8$ where $\beta_{2T}$ is the magnification of the whole of the second lens unit at the telephoto position in the infinite object point focusing.

19 Claims, 21 Drawing Sheets

SPHERICAL ABERRATION
FNO 2.321

-0.10    0.10
(mm)

ASTIGMATISM
IH=3.60

-0.10    0.10
(mm)

DISTORTION
IH=3.60

-10.00   10.00
(%)

CHROMATIC ABERRATION OF MAGNIFICATION
IH=3.60

-0.01    0.01
(mm)

SPHERICAL ABERRATION
FNO 3.590

-0.10    0.10
(mm)

ASTIGMATISM
IH=3.60

-0.10    0.10
(mm)

DISTORTION
IH=3.60

-10.00   10.00
(%)

CHROMATIC ABERRATION OF MAGNIFICATION
IH=3.60

-0.01    0.01
(mm)

SPHERICAL ABERRATION
FNO 5.435

-0.10    0.10
(mm)

ASTIGMATISM
IH=3.60

-0.10    0.10
(mm)

DISTORTION
IH=3.60

-10.00   10.00
(%)

CHROMATIC ABERRATION OF MAGNIFICATION
IH=3.60

-0.01    0.01
(mm)

WAVELENGTH (nm)   546.07 — — —   486.13 — · · —   587.56 ———
                  435.84 — — — —  656.27 - - - - - -

SPHERICAL ABERRATION
FNO 2.321

ASTIGMATISM
IH=3.60

DISTORTION
IH=3.60

CHROMATIC ABERRATION OF MAGNIFICATION
IH=3.60

SPHERICAL ABERRATION
FNO 3.590

ASTIGMATISM
IH=3.60

DISTORTION
IH=3.60

CHROMATIC ABERRATION OF MAGNIFICATION
IH=3.60

SPHERICAL ABERRATION
FNO 5.435

ASTIGMATISM
IH=3.60

DISTORTION
IH=3.60

CHROMATIC ABERRATION OF MAGNIFICATION
IH=3.60

WAVELENGTH (nm)  546.07  486.13  587.56
435.84  656.27

SPHERICAL ABERRATION
FNO 2.547

ASTIGMATISM
IH=3.60

DISTORTION
IH=3.60

CHROMATIC ABERRATION OF MAGNIFICATION
IH=3.60

SPHERICAL ABERRATION
FNO 3.964

ASTIGMATISM
IH=3.60

DISTORTION
IH=3.60

CHROMATIC ABERRATION OF MAGNIFICATION
IH=3.60

SPHERICAL ABERRATION
FNO 5.955

ASTIGMATISM
IH=3.60

DISTORTION
IH=3.60

CHROMATIC ABERRATION OF MAGNIFICATION
IH=3.60

WAVELENGTH (nm)  546.07 ——— 486.13 ——— 587.56 ———
435.84 ----- 656.27 ---------

SPHERICAL ABERRATION
FNO 2.506

-0.10   0.10
(mm)

ASTIGMATISM
IH=3.60

-0.10   0.10
(mm)

DISTORTION
IH=3.60

-10.00   10.00
(%)

CHROMATIC ABERRATION OF MAGNIFICATION
IH=3.60

-0.01   0.01
(mm)

SPHERICAL ABERRATION
FNO 3.843

-0.10   0.10
(mm)

ASTIGMATISM
IH=3.60

-0.10   0.10
(mm)

DISTORTION
IH=3.60

-10.00   10.00
(%)

CHROMATIC ABERRATION OF MAGNIFICATION
IH=3.60

-0.01   0.01
(mm)

SPHERICAL ABERRATION
FNO 5.868

-0.10   0.10
(mm)

ASTIGMATISM
IH=3.60

-0.10   0.10
(mm)

DISTORTION
IH=3.60

-10.00   10.00
(%)

CHROMATIC ABERRATION OF MAGNIFICATION
IH=3.60

-0.01   0.01
(mm)

WAVELENGTH (nm)   546.07 ———   486.13 — — —   587.56 ———
                  435.84 — — —   656.27 - - - - -

SPHERICAL ABERRATION
FNO 2.528

ASTIGMATISM
IH=3.60

DISTORTION
IH=3.60

CHROMATIC ABERRATION OF MAGNIFICATION
IH=3.60

SPHERICAL ABERRATION
FNO 3.930

ASTIGMATISM
IH=3.60

DISTORTION
IH=3.60

CHROMATIC ABERRATION OF MAGNIFICATION
IH=3.60

SPHERICAL ABERRATION
FNO 5.914

ASTIGMATISM
IH=3.60

DISTORTION
IH=3.60

CHROMATIC ABERRATION OF MAGNIFICATION
IH=3.60

WAVELENGTH (nm)   546.07 ———   486.13 ———   587.56 ———
                  435.84 -----   656.27 ---------

SPHERICAL ABERRATION
FNO 2.528

-0.10　　0.10
(mm)

ASTIGMATISM
IH=3.60

-0.10　　0.10
(mm)

DISTORTION
IH=3.60

-10.00　　10.00
(%)

CHROMATIC ABERRATION OF MAGNIFICATION
IH=3.60

-0.01　　0.01
(mm)

SPHERICAL ABERRATION
FNO 3.930

-0.10　　0.10
(mm)

ASTIGMATISM
IH=3.60

-0.10　　0.10
(mm)

DISTORTION
IH=3.60

-10.00　　10.00
(%)

CHROMATIC ABERRATION OF MAGNIFICATION
IH=3.60

-0.01　　0.01
(mm)

SPHERICAL ABERRATION
FNO 5.914

-0.10　　0.10
(mm)

ASTIGMATISM
IH=3.60

-0.10　　0.10
(mm)

DISTORTION
IH=3.60

-10.00　　10.00
(%)

CHROMATIC ABERRATION OF MAGNIFICATION
IH=3.60

-0.01　　0.01
(mm)

WAVELENGTH (nm)　　546.07 ———　486.13 — — —　587.56 ———
　　　　　　　　　　435.84 — — — —　656.27 - - - - - -

SPHERICAL ABERRATION

FNO 2.576

-0.10　　0.10
(mm)

ASTIGMATISM

IH=3.60

-0.10　　0.10
(mm)

DISTORTION

IH=3.60

-10.00　　10.00
(%)

CHROMATIC ABERRATION OF MAGNIFICATION

IH=3.60

-0.01　　0.01
(mm)

SPHERICAL ABERRATION

FNO 3.987

-0.10　　0.10
(mm)

ASTIGMATISM

IH=3.60

-0.10　　0.10
(mm)

DISTORTION

IH=3.60

-10.00　　10.00
(%)

CHROMATIC ABERRATION OF MAGNIFICATION

IH=3.60

-0.01　　0.01
(mm)

SPHERICAL ABERRATION

FNO 6.083

-0.10　　0.10
(mm)

ASTIGMATISM

IH=3.60

-0.10　　0.10
(mm)

DISTORTION

IH=3.60

-10.00　　10.00
(%)

CHROMATIC ABERRATION OF MAGNIFICATION

IH=3.60

-0.01　　0.01
(mm)

WAVELENGTH (nm)　　546.07　——　　486.13　———　　587.56 ———
　　　　　　　　　　435.84　-----　　656.27　---------

SPHERICAL ABERRATION
FNO 2.656

-0.10  0.10 (mm)

ASTIGMATISM
IH=3.60

-0.10  0.10 (mm)

DISTORTION
IH=3.60

-10.00  10.00 (%)

CHROMATIC ABERRATION OF MAGNIFICATION
IH=3.60

-0.01  0.01 (mm)

SPHERICAL ABERRATION
FNO 4.129

-0.10  0.10 (mm)

ASTIGMATISM
IH=3.60

-0.10  0.10 (mm)

DISTORTION
IH=3.60

-10.00  10.00 (%)

CHROMATIC ABERRATION OF MAGNIFICATION
IH=3.60

-0.01  0.01 (mm)

SPHERICAL ABERRATION
FNO 6.189

-0.10  0.10 (mm)

ASTIGMATISM
IH=3.60

-0.10  0.10 (mm)

DISTORTION
IH=3.60

-10.00  10.00 (%)

CHROMATIC ABERRATION OF MAGNIFICATION
IH=3.60

-0.01  0.01 (mm)

WAVELENGTH (nm)   546.07 — — —   486.13 — — —   587.56 ———
                  435.84 — — —   656.27 -------

SPHERICAL ABERRATION
FNO 2.543

ASTIGMATISM
IH=3.60

DISTORTION
IH=3.60

CHROMATIC ABERRATION OF MAGNIFICATION
IH=3.60

SPHERICAL ABERRATION
FNO 3.961

ASTIGMATISM
IH=3.60

DISTORTION
IH=3.60

CHROMATIC ABERRATION OF MAGNIFICATION
IH=3.60

SPHERICAL ABERRATION
FNO 5.945

ASTIGMATISM
IH=3.60

DISTORTION
IH=3.60

CHROMATIC ABERRATION OF MAGNIFICATION
IH=3.60

WAVELENGTH (nm)  546.07 — · · —   486.13 — · —   587.56 ———
435.84 — — —   656.27 - - - - -

ZOOM LENS AND ELECTRONIC IMAGING APPARATUS USING THE SAME

This application claims benefits of Application No. 2005-039454 filed in Japan on Feb. 16, 2005, the contents of which are hereby incorporated by reference.

BACKGROUND OF THE INVENTION

1. Field of the Invention

The invention relates to a zoom lens and an electronic imaging apparatus using the zoom lens, and in particular, to a zoom lens in which a slim design regarding a depth direction is attained by considering the optical system of the zoom lens, and an electronic imaging apparatus, such as a digital camera, using the zoom lens.

2. Description of Related Art

Recently, as an alternative to cameras for silver halide 35 mm films (usually called Leica formats), digital cameras have mainly occupied a camera market and have come to have many categories in a wide range from a high-function type for business use to a popular portable type. The greatest obstacle to a reduction in depth of such a camera is the thickness of an optical system, notably a zoom lens system, extending from the most object-side surface to an imaging surface. Thus, in recent years, a so-called collapsible lens barrel has been chiefly used in which the optical system is shifted from a camera body in photography, while when the camera is not used, it is incorporated in the camera body. (Refer to References 1, 2, and 3 shown below.)

Reference 1: Japanese Patent Kokai No. Hei 11-142733
Reference 2: Japanese Patent Kokai No. 2002-372667
Reference 3: Japanese Patent Kokai No. 2002-196240

SUMMARY OF THE INVENTION

The zoom lens according to the present invention comprises, in order from the object side, a first lens unit with negative refracting power as a whole, consisting of a negative lens with a concave surface of strong curvature facing the image side and a positive lens and including at least one aspherical surface; a second lens unit with positive refracting power as a whole, comprising, in order from the object side, a positive lens and a lens component constructed by cementing a positive lens and a negative lens so that at least two surfaces, excluding a cemented surface between the positive lens and the negative lens constituting the lens component, are configured as aspherical surfaces; and a third lens unit consisting of a single positive lens component. When the magnification of the zoom lens is changed in the range from a wide-angle position to a telephoto position in infinite object point focusing, spacing between the first lens unit and the second lens unit is narrowed and spacing between the second lens unit and the third lens unit is widened. The zoom lens satisfies the following condition:

$$2.1 < |\beta 2T| < 2.8 \quad (1)$$

where $\beta 2T$ is the magnification of the whole of the second lens unit at the telephoto position in the infinite object point focusing.

It is desirable that the zoom lens according to the present invention satisfies the following condition:

$$0.4 < |f1|/fT < 0.7 \quad (2)$$

where f1 is the focal length of the first lens unit and fT is the focal length of the entire system of the zoom lens at the telephoto position.

In the zoom lens according to the present invention, it is desirable that the image-side surface of the negative lens of the first lens unit is aspherical.

In the zoom lens according to the present invention, it is desirable that both surfaces of the positive lens located on the object side in the second lens unit are aspherical.

It is desirable that the zoom lens according to the present invention satisfies the following condition:

$$0.7 < f3/fT < 1.2 \quad (3)$$

where f3 is the focal length of the third lens unit.

It is desirable that the zoom lens according to the present invention satisfies the following condition:

$$20 < |v_{22} - v_{23}| \quad (4)$$

where $v_{22}$ is the Abbe's number of the positive lens contained in the cemented lens component of the second lens unit and $v_{22}$ is the Abbe's number of the negative lens contained in the cemented lens component of the second lens unit.

In the zoom lens according to the present invention, it is desirable that the entrance and exit surfaces of the positive lens component constituting the third lens unit that come in contact with air are both aspherical.

In the zoom lens according to the present invention, it is desirable that the second lens unit is constructed with four lenses: the positive lens, the lens component in which the positive lens and the negative lens are cemented, and a positive lens, arranged in this order from the object side.

In the zoom lens according to the present invention, it is desirable that the third lens unit consists of a single positive lens.

In the zoom lens according to the present invention, it is desirable that a stop is interposed between the first lens unit and the second lens unit and is moved integrally with the second lens unit when the magnification is changed in the range from the wide-angle position to the telephoto position.

The imaging apparatus according to the present invention comprises the zoon lens described above and an electronic image sensor located on the image side of the zoom lens.

According to the present invention, the zoom lens in which imaging performance is high and the overall length in the use of the collapsible lens barrel is reduced can be obtained.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
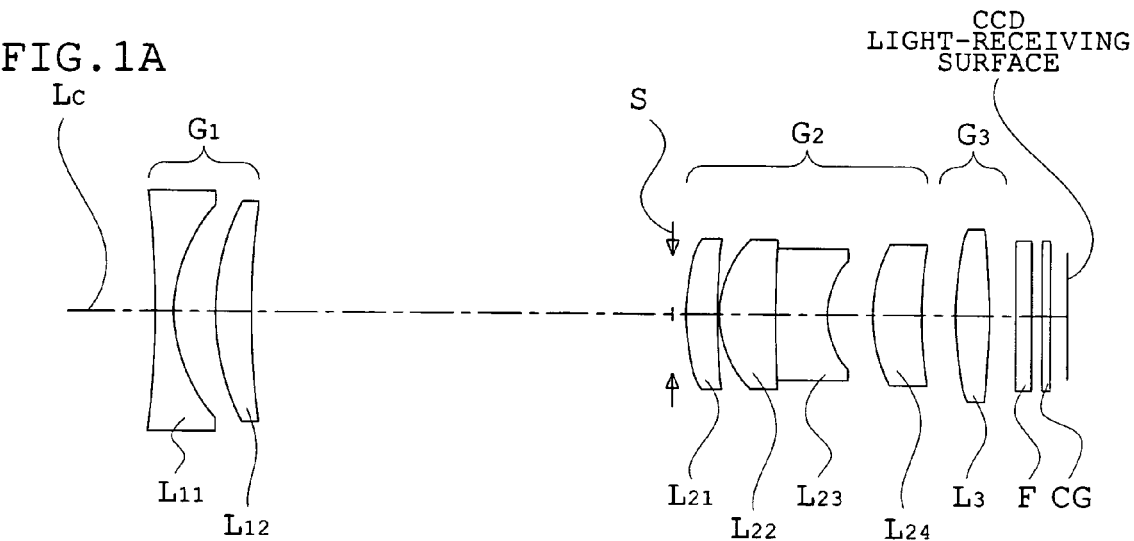
FIGS. 1A, 1B, and 1C are sectional views showing optical arrangements, developed along the optical axis, at wide-angle, middle, and telephoto positions, respectively, of the zoom lens in a first embodiment of the present invention.

Before undertaking the description of the embodiments, the function and effect of the present invention will be explained.

A three-lens-unit arrangement including a first lens unit with negative power, a second lens unit with positive power, and a third lens unit with positive power is known as a zoom lens suitable for an electronic image sensor. In the present invention also, such a three-lens-unit arrangement is adopted. By constructing the zoom lens as mentioned above, telecentricity is improved and light rays can be rendered efficiently incident on a CCD. Moreover, since a back focus can be increased, space for placing members, such as an optical low-pass filter and an infrared cutoff filter, can be ensured.

The first lens unit is constructed with two lenses: a negative lens with a concave surface of strong curvature facing the image side and a positive lens. When the first lens unit is designed to have at least one aspherical surface, chromatic aberration and off-axis aberrations can be favorably corrected and the number of constituent lenses can be reduced. In addition, when the image-side surface of the negative lens is configured as the aspherical surface, a considerable effect is brought about on correction for off-axis aberration at the wide-angle position. Also, the negative lens with a concave surface of strong curvature facing the image side refers to the one in which the absolute value of the curvature of the image-side concave surface is larger than that of the curvature of the object-side surface.

The second lens unit includes, in order form the object side, a positive lens and a cemented lens component that has a positive lens and a negative lens, and introduces a plurality of aspherical surfaces. When the second lens unit is constructed in this way, the amount of aberration produced in the second lens unit can be lessened. The negative lens in the second lens unit has the function of canceling spherical aberration and coma, produced in the positive lens. On the other hand, the production of decentration aberration due to relative decentration to other lenses is prominent, and thus cementation with the positive lens having the surface to be chiefly corrected for aberration allows the production of aberration due to the relative decentration to be suppressed. In this case, when an attempt is made so that aberrations are canceled in the cemented lens component as far as possible and less sensitivity to decentration is obtained, a sensitivity to the relative decentration with a remaining single positive lens component can be moderated. Also, in view of correction for spherical aberration, the moderation of the sensitivity to the relative decentration in the lens unit, and manufacturing cost, it is favorable that the plurality of aspherical surfaces introduced into the second lens unit are both surfaces of the object-side positive lens.

The third lens unit is constructed with a single positive lens component. Unless strong power is imparted to the positive lens component, there is no problem in practical use from a consideration of correction for aberration. When both surfaces of the positive lens component are configured to be aspherical in order to correct residual aberrations that have been not completely corrected in the first lens unit and the second lens unit, this has a considerable effect on correction for aberration such as curvature of field. Also, in the lens component, a single lens or a cemented lens is taken as one component unit.

When distortion is not completely corrected, it is only necessary to take a means for correcting distortion at will through image processing.

The zoom lens according to the present invention is designed to satisfy Condition (1).

Beyond the upper limit of Condition (1), the variable magnification ratio is increased and thus a compact design of the zoom lens may be attained. However, the power of the first lens unit and the second lens unit is increased and correction for aberration becomes difficult. Below the lower limit, spacing between the first lens unit and the second lens unit is extremely widened at the wide-angle position, and therefore, the effective diameter of the first lens unit must be enlarged. As a result, since the lens thickness is also increased, the compact design becomes difficult, and negative distortion is liable to be produced at the wide-angle position.

Here, in Condition (1), it is more desirable that the lower limit is set to 2.3 or 2.5 and the upper limit is set to 2.75 or 2.7.

It is desirable that the zoom lens according to the present invention is designed to satisfy Condition (2).

Beyond the upper limit of Condition (2), the power of the first lens unit is lessened and hence the amount of lens movement in the magnification change is increased, with the result that it becomes difficult to reduce the overall length of the zoom lens. Below the lower limit, aberration produced in the first lens unit ceases to be completely corrected, and it becomes difficult to construct the first lens unit with two lenses.

Here, in Condition (2), it is more desirable that the lower limit is set to 0.45 or 0.5 and the upper limit is set to 0.65 or 0.6.

It is desirable that the zoom lens according to the present invention is designed to satisfy Condition (3).

Beyond the upper limit of Condition (3), the back focus is increased. Moreover, when focusing is performed by the third lens unit, the amount of lens movement is increased so that it is necessary to ensure the space, and thus the compact design becomes difficult. Below the lower limit, aberration produced in the third lens unit is increased and ceases to be correctable with the construction of the single lens component.

Here, in Condition (3), it is more desirable that the lower limit is set to 0.8 or 0.9 and the upper limit is set to 1.17 or 1.13.

It is desirable that the zoom lens according to the present invention is designed to satisfy Condition (4).

Below the lower limit of Condition (4), axial chromatic aberration and chromatic aberration of magnification are liable to be undercorrected.

When the second lens unit is constructed with four lenses: a positive lens, a cemented lens component of a positive lens and a negative lens, and a positive lens, arranged in this order from the object side, it becomes easy to hold the balance between correction for aberration and the compact design while ensuring the refracting power of the second lens unit.

The third lens unit is constructed with a single positive lens component and thereby the number of constituent lenses is reduced. This is advantageous for a compact design in the use of the collapsible lens barrel.

A stop is interposed between the first lens unit and the second lens unit and is moved integrally with the second lens unit in the magnification change ranging from the wide-angle position to the telephoto position. Whereby, a light beam emerging from the third lens unit is rendered easily parallel, the second lens unit is easily designed to be compact, and oversizing of the first lens unit at the wide-angle position can be suppressed.

Furthermore, when the zoom lens of the present invention is used in the electronic imaging apparatus provided with an electronic image sensor, the electronic imaging apparatus that is compact and shows a high zoom ratio in the use of the collapsible lens barrel can be constructed.

When the negative lens of the first lens unit is configured into a biconcave shape and the positive lens is configured as a positive meniscus lens with a convex surface facing the object side, the negative power of the first lens unit can be shared among three surfaces and thus the thickness of the first lens unit is reduced. This is favorable for correcting spherical aberration and coma.

In the second lens unit, it is desirable that the object-side positive lens is configured as a biconvex lens, the cemented lens component constructed by cementing the positive lens and negative lens is configured into a meniscus shape with a convex surface facing the object side, and the image-side positive lens is configured as a positive meniscus lens with a convex surface facing the object side. When the second lens unit is constructed as mentioned above, light incident on the second lens unit can be converted into convergent light while suppressing the production of aberration by three convex surfaces arranged toward the object side in the second lens unit. This is favorable for a reduction in diameter of the second lens unit. In addition, since the second lens unit has, in order from the object side, positive, negative, and positive power, the production of aberration of the second lens unit itself is easily suppressed. Each of the cemented lens component and the image-side positive lens in the second lens unit is configured into the meniscus shape with a convex surface facing the object side. Whereby, the principal point of the second lens unit is shifted to the object side, and spacing between the principal points of the first lens unit and the second lens unit at the telephoto position is narrowed, which is advantageous for a high variable magnification ratio.

In accordance with the embodiments shown in the drawings, the present invention will be described in detail.

Also, in each of the embodiments described below, RDY denotes the radius of curvature of the surface of each lens, THI denotes the thickness of each lens or spacing between lenses, Nd denotes the refractive index of each lens, Vd denotes the Abbe's number of each lens, K denotes a conic constant, and $A_4$, $A_6$, $A_8$, and $A_{10}$ denote aspherical coefficients.

The configuration of each of the aspherical surfaces mentioned above is expressed by the following equation, using the aspherical coefficients. Here, Z is taken as the coordinate in the direction of the optical axis and Y is taken as the coordinate normal to the optical axis.

$$Z=(Y^2/r)/[1+\{1-(1+K)\cdot(Y/r)^2\}^{1/2}]+A_4 Y^4+A_6 Y^6+A_8 Y^8+A_{10} Y^{10}$$

In the aspherical coefficients, for example, the value of $A_4$ in the spherical surface 2 of the first embodiment, −2.1830E-4, can also be expressed as $-2.1830 \times 10^{-4}$, but in the numerical data of each embodiment, such a value is expressed in the former form.

In any embodiment, a distance between a cover glass and a light-receiving surface of an electronic image sensor such as a CCD is 1 mm. The diagonal length of the CCD in an effective imaging area is 7.20 mm.

First Embodiment

Figure 1B:
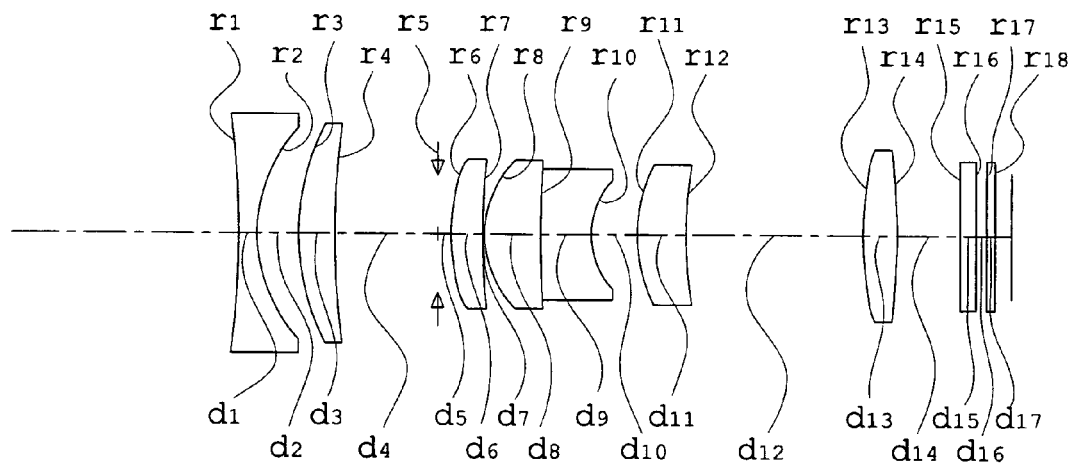
Figure 1C:
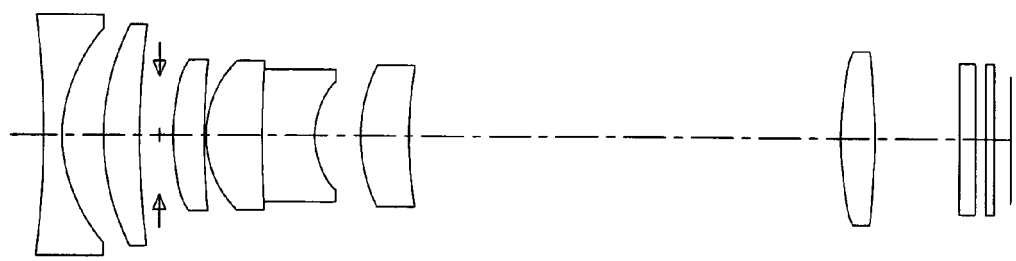
Figure 2A:
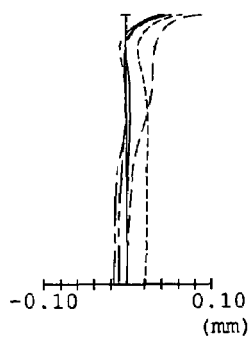
FIGS. 2A, 2B, 2C, and 2D are diagrams showing aberration characteristics at the wide-angle position of the zoom lens in the first embodiment.
Figure 2B:
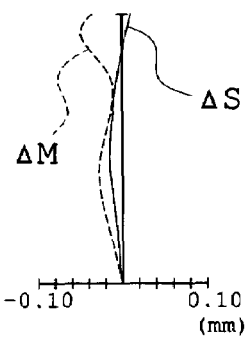
Figure 2C:
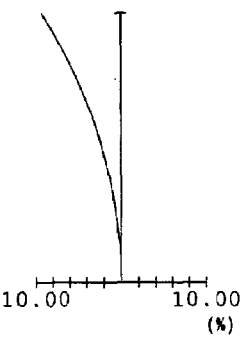
Figure 2D:
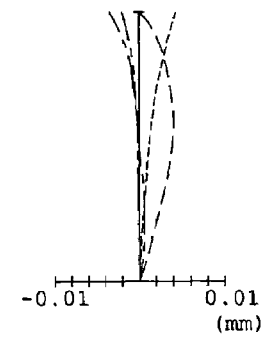
Figure 2E:
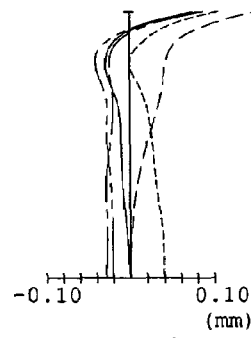
FIGS. 2E, 2F, 2G, and 2H are diagrams showing aberration characteristics at the middle position of the zoom lens in the first embodiment.
Figure 2F:
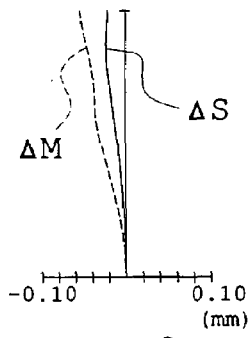
Figure 2G:
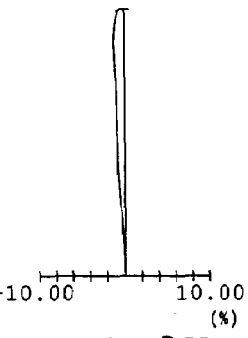
Figure 2H:
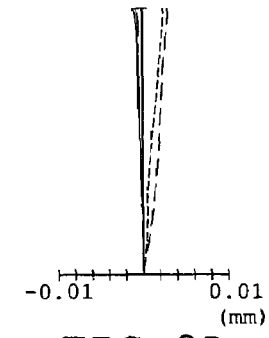
Figure 2I:
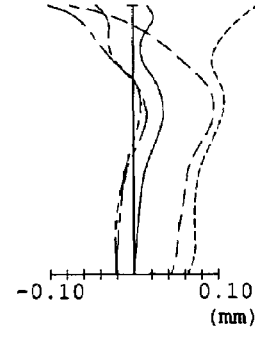
FIGS. 2I, 2J, 2K, and 2L are diagrams showing aberration characteristics at the telephoto position of the zoom lens in the first embodiment.
Figure 2J:
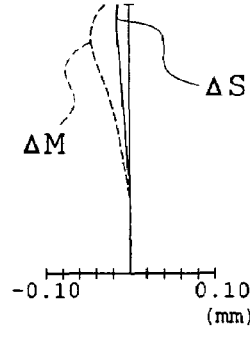
Figure 2K:
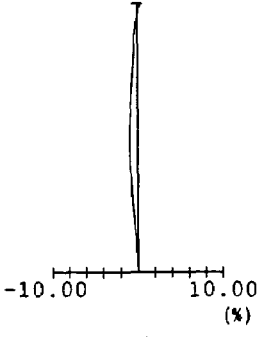
Figure 2L:
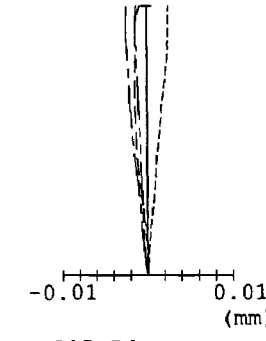

FIGS. 1A–1C show the arrangements of the zoom lens in this embodiment. FIGS. 2A–2L show aberration characteristics in the infinite object point focusing of the zoom lens of the first embodiment.

The zoom lens of the first embodiment, as shown in FIGS. 1A–1C, comprises a first lens unit $G_1$ with negative power, a second lens unit $G_2$ with positive power, and a third lens unit $G_3$ with positive power. The first lens unit $G_1$ includes a negative lens $L_{11}$ with a concave surface of strong curvature facing the image side and a positive lens $L_{12}$. The second lens unit $G_2$ includes a positive lens $L_{21}$, a cemented lens component of a positive lens $L_{22}$ and a negative lens $L_{23}$, arrange in this order, and a positive lens $L_{24}$. The third lens unit $G_3$ is constructed with a single positive lens component $L_3$. The first lens unit $G_1$, the second lens unit $G_2$, and the third lens unit $G_3$ can be moved independently along an optical axis $L_C$. Also, reference symbol S represents a stop and F represents filters such as an optical low-pass filter and an infrared cutoff filter. Reference symbol CG denotes a cover glass for an electronic image sensor such as a CCD or CMOS. In the zoom lens of the first embodiment constructed as mentioned above, the first lens unit $G_1$, the second lens unit $G_2$, and the third lens unit $G_3$ are moved along the optical axis $L_C$ and thereby the magnification change is carried out.

Subsequently, numerical data of lenses constituting the zoom lens in the first embodiment are shown below.

| Surface | RDY | THI | Nd | Vd |
|---|---|---|---|---|
| 1 | −57.9168 | 1.1000 | 1.76802 | 49.24 |
| 2$ | 7.6241 | 2.5000 | 1 | |
| 3 | 14.8063 | 2.1576 | 1.84666 | 23.78 |
| 4 | 50.2409 | D4 | 1 | |
| Stop | ∞ | 0.8000 | 1 | |
| 6$ | 13.1884 | 1.9014 | 1.69350 | 53.20 |
| 7$ | −840.7341 | 0.1000 | 1 | |
| 8 | 6.4514 | 3.3914 | 1.48749 | 70.23 |
| 9 | 71.1543 | 3.1000 | 1.82114 | 24.06 |
| 10$ | 5.1286 | 2.7667 | 1 | |
| 11 | 9.7367 | 2.9000 | 1.66680 | 33.00 |
| 12 | 25.9941 | D12 | 1 | |
| 13$ | 23.4382 | 2.0449 | 1.58313 | 59.46 |
| 14$ | −58.1099 | D14 | 1 | |
| 15 | ∞ | 0.9500 | 1.54771 | 62.84 |
| 16 | ∞ | 0.6000 | 1 | |
| 17 | ∞ | 0.5000 | 1.51633 | 64.14 |
| 18 | ∞ | | | |

Aspherical coefficients

| Surface | RDY | K |
|---|---|---|
| 2 | 7.6241 | −0.2100 |

| $A_4$ | $A_6$ | $A_8$ | $A_{10}$ |
|---|---|---|---|
| −2.1830E-4 | 8.1953E-7 | −9.2255E-8 | 6.7644E-10 |

| Surface | RDY | K |
|---|---|---|
| 6 | 13.1884 | −14.9562 |

| $A_4$ | $A_6$ | $A_8$ | $A_{10}$ |
|---|---|---|---|
| 1.1095E-3 | −2.0903E-5 | 1.0712E-6 | 3.2104E-9 |

| Surface | RDY | K |
|---|---|---|
| 7 | −840.7341 | −0.1019 |

| $A_4$ | $A_6$ | $A_8$ | $A_{10}$ |
|---|---|---|---|
| 3.9137E-4 | 9.7574E-6 | −6.9480E-8 | 4.1396E-8 |

| Surface | RDY | K |
|---|---|---|
| 10 | 5.1286 | 0.0140 |

| $A_4$ | $A_6$ | $A_8$ | $A_{10}$ |
|---|---|---|---|
| 2.7213E-4 | 1.9577E-5 | −8.9370E-7 | 6.7425E-8 |

| Surface | RDY | K |
|---|---|---|
| 13 | 23.4382 | 0 |

| $A_4$ | $A_6$ | $A_8$ | $A_{10}$ |
|---|---|---|---|
| −1.0251E-3 | 5.6208E-5 | −1.0253E-6 | 1.8728E-8 |

-continued

| Surface | RDY | K | |
|---|---|---|---|
| 14 | −58.1099 | 0 | |

| $A_4$ | $A_6$ | $A_8$ | $A_{10}$ |
|---|---|---|---|
| −1.2958E−3 | 8.0593E−5 | −1.9831E−6 | 4.1178E−8 |

Zoom data

| | Wide-angle | Middle | Telephoto |
|---|---|---|---|
| Focal length | 6.12 | 16.0 | 29.4 |
| FNO | 2.55 | 3.93 | 5.94 |
| D4 | 25.33 | 6.17 | 1.20 |
| D12 | 2.02 | 10.63 | 25.97 |
| D14 | 1.55 | 3.75 | 5.01 |

$: Aspherical surface

Also, in the data of the above conditions, $|\beta 2T|=2.56$, $|f1|/fT=0.54$, $f3/fT=0.98$, and $|v_{22}-v_{23}|=46.17$.

Second Embodiment

Figure 3A:
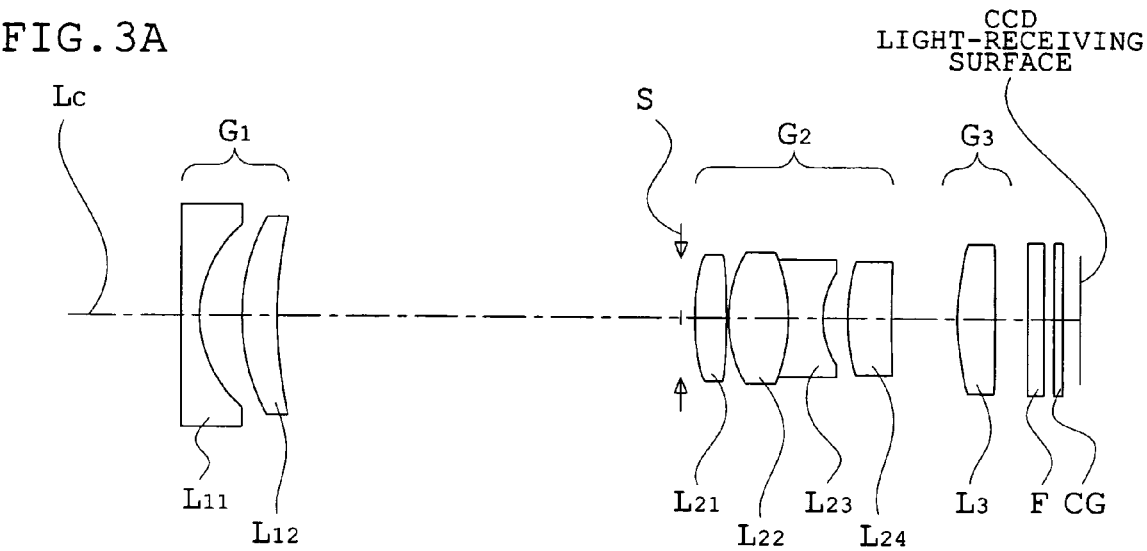
FIGS. 3A, 3B, and 3C are sectional views showing optical arrangements, developed along the optical axis, at wide-angle, middle, and telephoto positions, respectively, of the zoom lens in a second embodiment of the present invention.
Figure 3B:
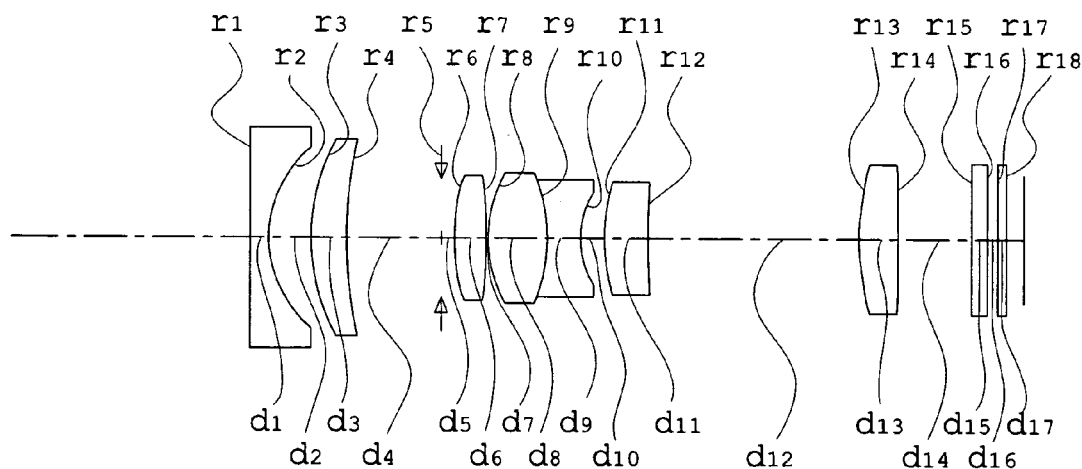
Figure 3C:
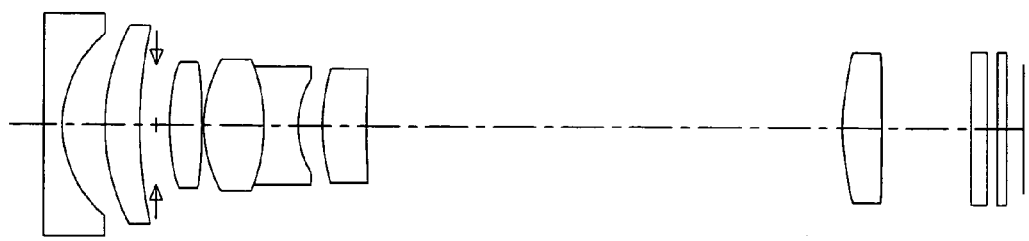
Figure 4A:
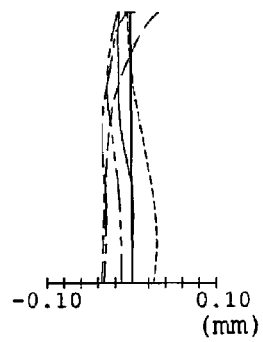
FIGS. 4A, 4B, 4C, and 4D are diagrams showing aberration characteristics at the wide-angle position of the zoom lens in the second embodiment.
Figure 4B:
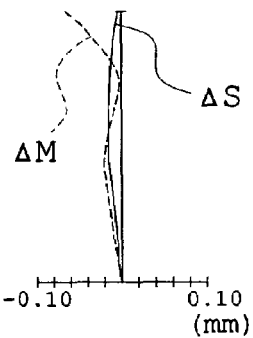
Figure 4C:
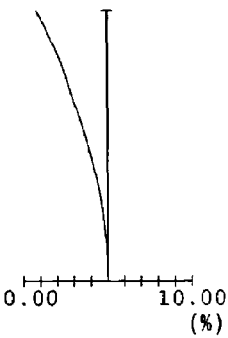
Figure 4D:
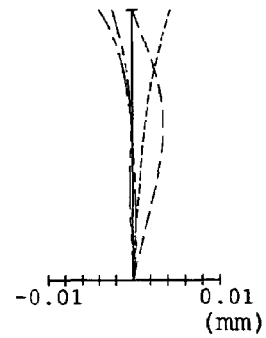
Figure 4E:
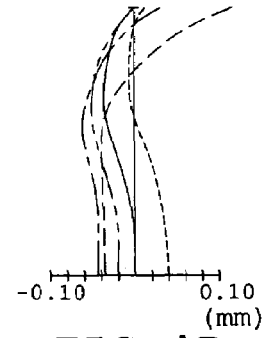
FIGS. 4E, 4F, 4G, and 4H are diagrams showing aberration characteristics at the middle position of the zoom lens in the second embodiment.
Figure 4F:
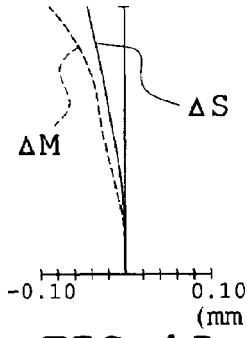
Figure 4G:
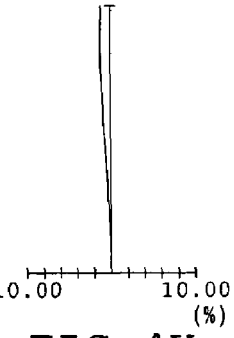
Figure 4H:
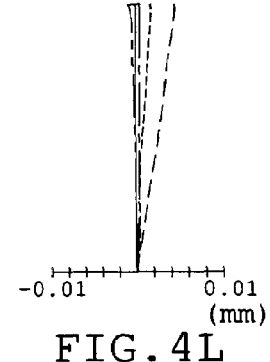
Figure 4I:
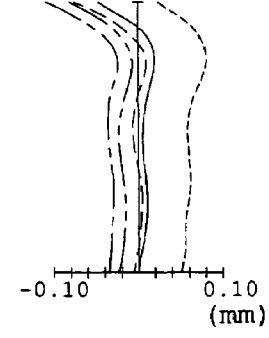
FIGS. 4I, 4J, 4K, and 4L are diagrams showing aberration characteristics at the telephoto position of the zoom lens in the second embodiment.
Figure 4J:
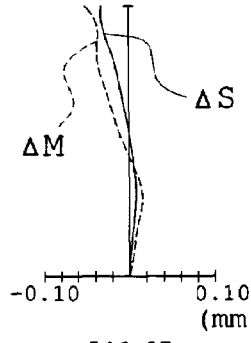
Figure 4K:
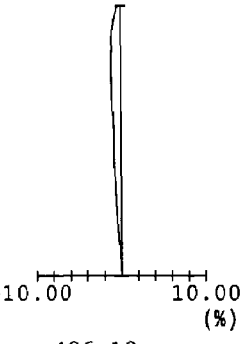
Figure 4L:
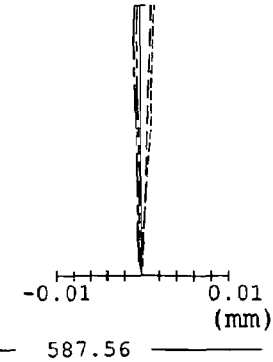

FIGS. 3A–3C show the arrangements of the zoom lens in this embodiment. FIGS. 4A–4L show aberration characteristics in the infinite object point focusing of the zoom lens of the second embodiment.

The zoom lens of the second embodiment, as shown in FIGS. 3A–3C, comprises the first lens unit $G_1$ with negative power, the second lens unit $G_2$ with positive power, and the third lens unit $G_3$ with positive power. The first lens unit $G_1$ includes the negative lens $L_{11}$ with a concave surface of strong curvature facing the image side and the positive lens $L_{12}$. The second lens unit $G_2$ includes the positive lens $L_{21}$, the cemented lens component of the positive lens $L_{22}$ and the negative lens $L_{23}$, arrange in this order, and the positive lens $L_{24}$. The third lens unit $G_3$ is constructed with the single positive lens component $L_3$. The first lens unit $G_1$, the second lens unit $G_2$, and the third lens unit $G_3$ can be moved independently along the optical axis $L_C$. Again, reference symbol S represents a stop and F represents filters such as an optical low-pass filter and an infrared cutoff filter. Reference symbol CG denotes a cover glass for an electronic image sensor such as a CCD or CMOS. In the zoom lens of the second embodiment constructed as mentioned above, the first lens unit $G_1$, the second lens unit $G_2$, and the third lens unit $G_3$ are moved along the optical axis $L_C$ and thereby the magnification change is carried out.

Subsequently, numerical data of lenses constituting the zoom lens in the second embodiment are shown below.

| Surface | RDY | THI | Nd | Vd |
|---|---|---|---|---|
| 1 | 3821.6144 | 1.1000 | 1.80610 | 40.73 |
| 2$ | 7.0024 | 2.5346 | 1 | |
| 3 | 12.6271 | 2.0798 | 1.92286 | 20.88 |
| 4 | 27.4692 | D4 | 1 | |
| Stop | ∞ | 0.8000 | 1 | |
| 6$ | 13.3331 | 1.9000 | 1.58313 | 59.46 |
| 7$ | −58.2694 | 0.1000 | 1 | |
| 8 | 8.0293 | 3.5504 | 1.69680 | 55.53 |
| 9 | −10.5393 | 2.0000 | 1.80100 | 34.97 |
| 10 | 5.2977 | 1.4479 | 1 | |
| 11 | 12.0406 | 2.6000 | 1.69680 | 55.53 |
| 12 | 73.6700 | D12 | 1 | |
| 13$ | 16.5116 | 2.3000 | 1.49700 | 81.61 |
| 14$ | −267.8961 | D14 | 1 | |
| 15 | ∞ | 0.9500 | 1.54771 | 62.84 |
| 16 | ∞ | 0.6000 | 1 | |
| 17 | ∞ | 0.5000 | 1.51633 | 64.14 |
| 18 | ∞ | | | |

Aspherical coefficients

| Surface | RDY | K |
|---|---|---|
| 2 | 7.0024 | −0.2100 |

| $A_4$ | $A_6$ | $A_8$ | $A_{10}$ |
|---|---|---|---|
| −1.7277E−4 | −1.0610E−6 | −3.5567E−8 | −5.6566E−10 |

| Surface | RDY | K |
|---|---|---|
| 6 | 13.3331 | −14.9562 |

| $A_4$ | $A_6$ | $A_8$ | $A_{10}$ |
|---|---|---|---|
| 7.9163E−4 | −2.0792E−5 | 6.2009E−7 | −4.8320E−9 |

| Surface | RDY | K |
|---|---|---|
| 7 | −58.2694 | −0.1019 |

| $A_4$ | $A_6$ | $A_8$ | $A_{10}$ |
|---|---|---|---|
| 1.3254E−5 | 5.2361E−6 | −2.4081E−7 | 9.9448E−9 |

| Surface | RDY | K |
|---|---|---|
| 13 | 16.5116 | 0 |

| $A_4$ | $A_6$ | $A_8$ | $A_{10}$ |
|---|---|---|---|
| −1.2564E−3 | 1.0687E−4 | −4.2596E−6 | 7.8329E−8 |

| Surface | RDY | K |
|---|---|---|
| 14 | −267.8961 | 0 |

| $A_4$ | $A_6$ | $A_8$ | $A_{10}$ |
|---|---|---|---|
| −1.6990E−3 | 1.4652E−4 | −5.8322E−6 | 1.0655E−7 |

Zoom data

| | Wide-angle | Middle | Telephoto |
|---|---|---|---|
| Focal length | 6.12 | 16.0 | 29.4 |
| FNO | 2.59 | 3.98 | 6.05 |
| D4 | 24.09 | 5.65 | 1.00 |
| D12 | 3.83 | 12.39 | 28.26 |
| D14 | 1.89 | 4.33 | 5.26 |

$: Aspherical surface

Also, in the data of the above conditions, $|\beta 2T|=2.69$, $|f1|/fT=0.52$, $f3/fT=1.06$, and $|v_{22}-v_{23}|=20.56$.

Third Embodiment

Figure 5A:
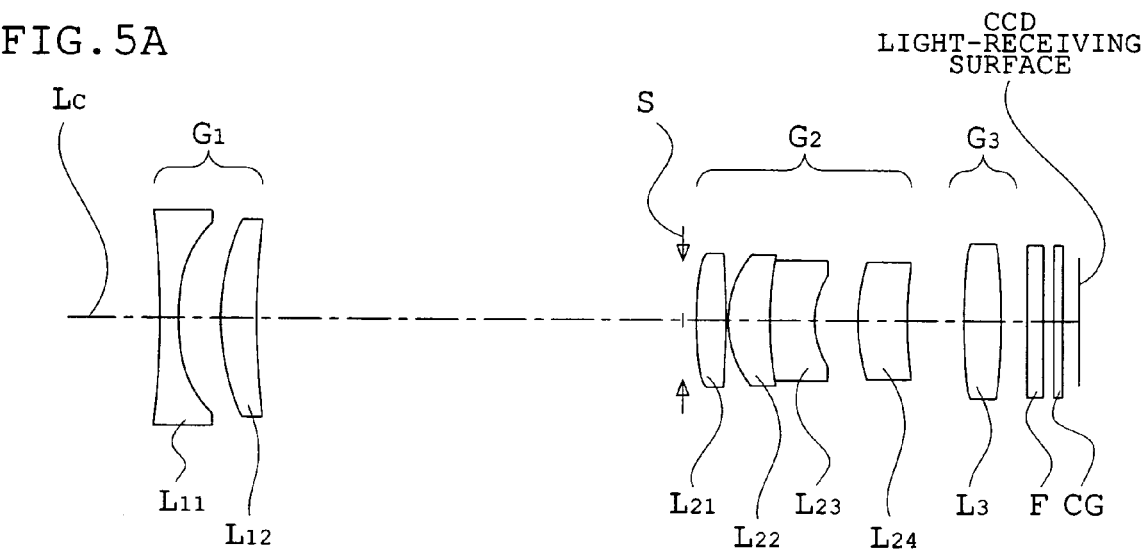
FIGS. 5A, 5B, and 5C are sectional views showing optical arrangements, developed along the optical axis, at wide-angle, middle, and telephoto positions, respectively, of the zoom lens in a third embodiment of the present invention.
Figure 5B:
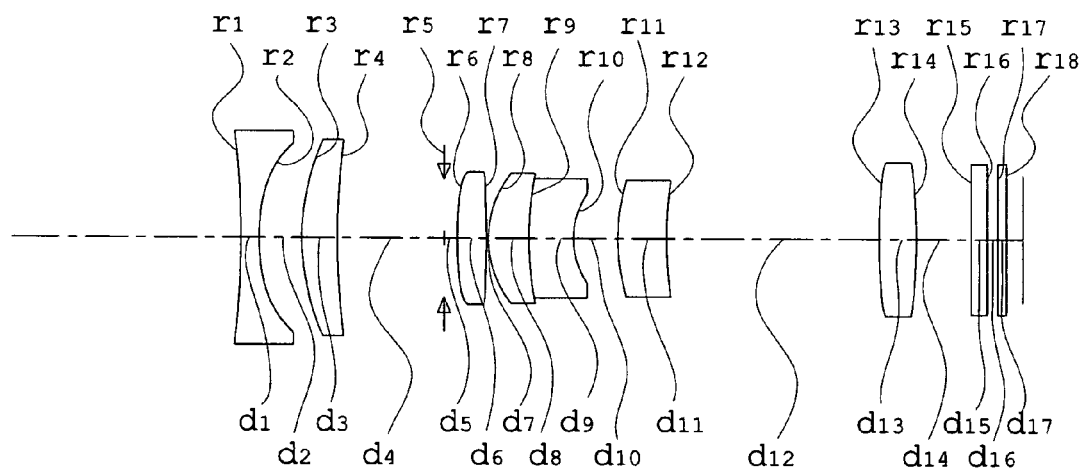
Figure 5C:
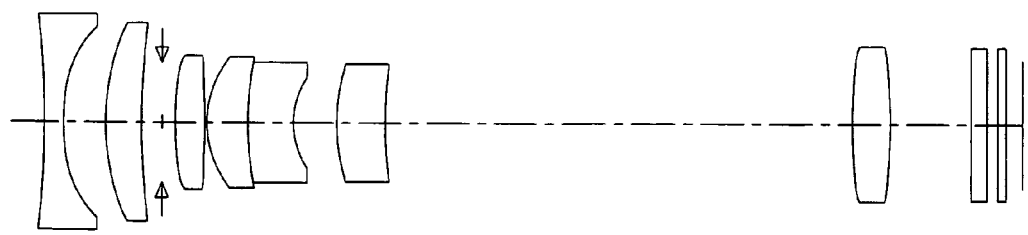
Figure 6A:
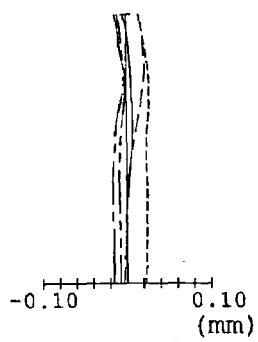
FIGS. 6A, 6B, 6C, and 6D are diagrams showing aberration characteristics at the wide-angle position of the zoom lens in the third embodiment.
Figure 6B:
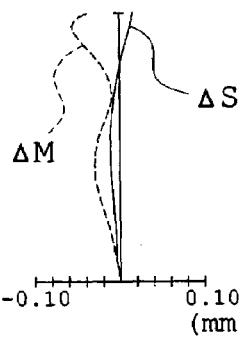
Figure 6C:
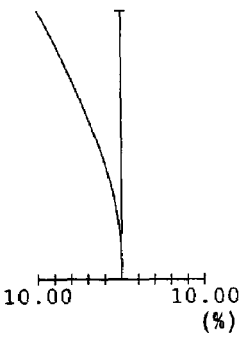
Figure 6D:
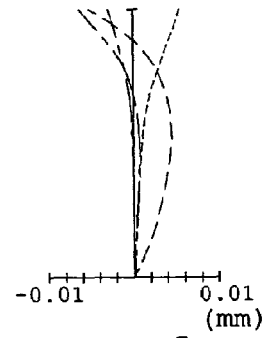
Figure 6E:
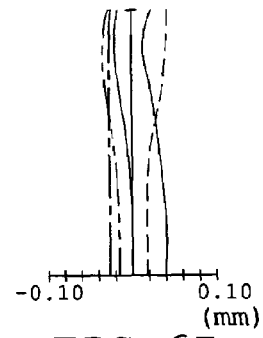
FIGS. 6E, 6F, 6G, and 6H are diagrams showing aberration characteristics at the middle position of the zoom lens in the third embodiment.
Figure 6F:
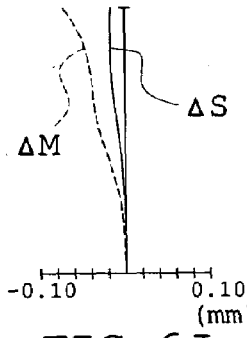
Figure 6G:
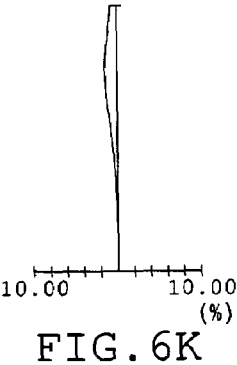
Figure 6H:
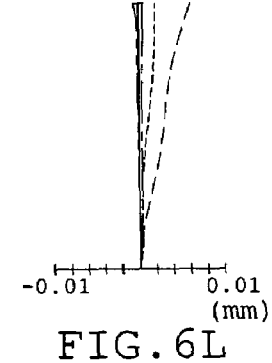
Figure 6I:
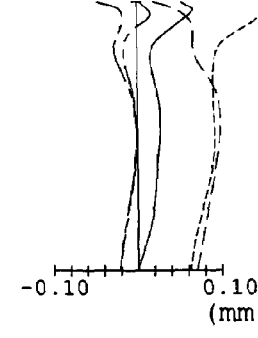
FIGS. 6I, 6J, 6K, and 6L are diagrams showing aberration characteristics at the telephoto position of the zoom lens in the third embodiment.
Figure 6J:
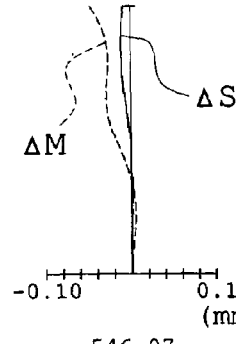
Figure 6K:
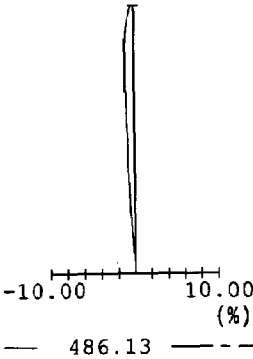
Figure 6L:
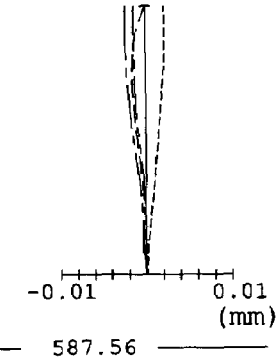

FIGS. 5A–5C show the arrangements of the zoom lens in this embodiment. FIGS. 6A–6L show aberration characteristics in the infinite object point focusing of the zoom lens of the third embodiment.

The zoom lens of the third embodiment, as shown in FIGS. 5A–5C, comprises the first lens unit $G_1$ with negative power, the second lens unit $G_2$ with positive power, and the third lens unit $G_3$ with positive power. The first lens unit $G_1$ includes the negative lens $L_{11}$ with a concave surface of strong curvature facing the image side and the positive lens $L_{12}$. The second lens unit $G_2$ includes the positive lens $L_{21}$, the cemented lens component of the positive lens $L_{22}$ and the negative lens $L_{23}$, arrange in this order, and the positive lens $L_{24}$. The third lens unit $G_3$ is constructed with the single positive lens component $L_3$. The first lens unit $G_1$, the second lens unit $G_2$, and the third lens unit $G_3$ can be moved independently along the optical axis $L_C$. Again, reference symbol S represents a stop and F represents filters such as an optical low-pass filter and an infrared cutoff filter. Reference symbol CG denotes a cover glass for an electronic image sensor such as a CCD or CMOS. In the zoom lens of the third embodiment constructed as mentioned above, the first lens unit $G_1$, the second lens unit $G_2$, and the third lens unit $G_3$ are moved along the optical axis $L_C$ and thereby the magnification change is carried out.

Subsequently, numerical data of lenses constituting the zoom lens in the third embodiment are shown below.

| Surface | RDY | THI | Nd | Vd |
|---|---|---|---|---|
| 1 | −56.4648 | 1.1000 | 1.76800 | 49.24 |
| 2$ | 7.6031 | 2.5000 | 1 | |
| 3$ | 14.2915 | 2.1285 | 1.82114 | 24.06 |
| 4 | 49.6825 | D4 | 1 | |
| Stop | ∞ | 0.8000 | 1 | |
| 6$ | 13.4092 | 1.7637 | 1.69350 | 53.20 |
| 7$ | −87.1251 | 0.1000 | 1 | |
| 8 | 6.3794 | 2.4500 | 1.48749 | 70.23 |
| 9 | 21.2955 | 2.6439 | 1.84666 | 23.78 |
| 10 | 4.9368 | 2.5923 | 1 | |
| 11 | 12.0010 | 2.9000 | 1.80610 | 40.90 |
| 12 | 25.7249 | D12 | 1 | |
| 13$ | 20.4090 | 2.2350 | 1.58313 | 59.46 |
| 14$ | −97.3305 | D14 | 1 | |
| 15 | ∞ | 0.9500 | 1.54771 | 62.84 |
| 16 | ∞ | 0.6000 | 1 | |
| 17 | ∞ | 0.5000 | 1.51633 | 64.14 |
| 18 | ∞ | | | |

Aspherical coefficients

| Surface | RDY | K |
|---|---|---|
| 2 | 7.6031 | −0.2100 |

| $A_4$ | $A_6$ | $A_8$ | $A_{10}$ |
|---|---|---|---|
| −2.5033E−4 | 3.1022E−6 | −2.1255E−7 | 1.7398E−9 |

| Surface | RDY | K |
|---|---|---|
| 3 | 14.2915 | 0.0455 |

| $A_4$ | $A_6$ | $A_8$ | $A_{10}$ |
|---|---|---|---|
| −2.3766E−5 | 1.1714E−6 | −6.1239E−8 | 4.2828E−10 |

| Surface | RDY | K |
|---|---|---|
| 6 | 13.4092 | −14.9562 |

| $A_4$ | $A_6$ | $A_8$ | $A_{10}$ |
|---|---|---|---|
| 9.7047E−4 | −1.9353E−5 | 9.3475E−7 | 1.3660E−8 |

| Surface | RDY | K |
|---|---|---|
| 7 | −87.1251 | −0.1019 |

| $A_4$ | $A_6$ | $A_8$ | $A_{10}$ |
|---|---|---|---|
| 2.9948E−4 | 8.8986E−6 | −1.2250E−7 | 4.7922E−8 |

-continued

| Surface | RDY | K |
|---|---|---|
| 13 | 20.4090 | 0 |

| $A_4$ | $A_6$ | $A_8$ | $A_{10}$ |
|---|---|---|---|
| −1.2080E−3 | 5.6796E−5 | −5.6965E−7 | 6.8543E−9 |

| Surface | RDY | K |
|---|---|---|
| 14 | −97.3305 | 0 |

| $A_4$ | $A_6$ | $A_8$ | $A_{10}$ |
|---|---|---|---|
| −1.6435E−3 | 8.9772E−5 | −1.7621E−6 | 3.3608E−8 |

Zoom data

| | Wide-angle | Middle | Telephoto |
|---|---|---|---|
| Focal length | 6.12 | 16.0 | 29.4 |
| FNO | 2.54 | 3.96 | 5.95 |
| D4 | 25.39 | 6.37 | 1.20 |
| D12 | 3.37 | 12.55 | 27.72 |
| D14 | 1.55 | 3.26 | 4.81 |

$: Aspherical surface

Also, in the data of the above conditions, $|\beta 2T|=2.62$, $|f1|/fT=0.53$, $f3/fT=0.99$, and $|v_{22}-v_{23}|=46.45$.

Fourth Embodiment

Figure 7A:
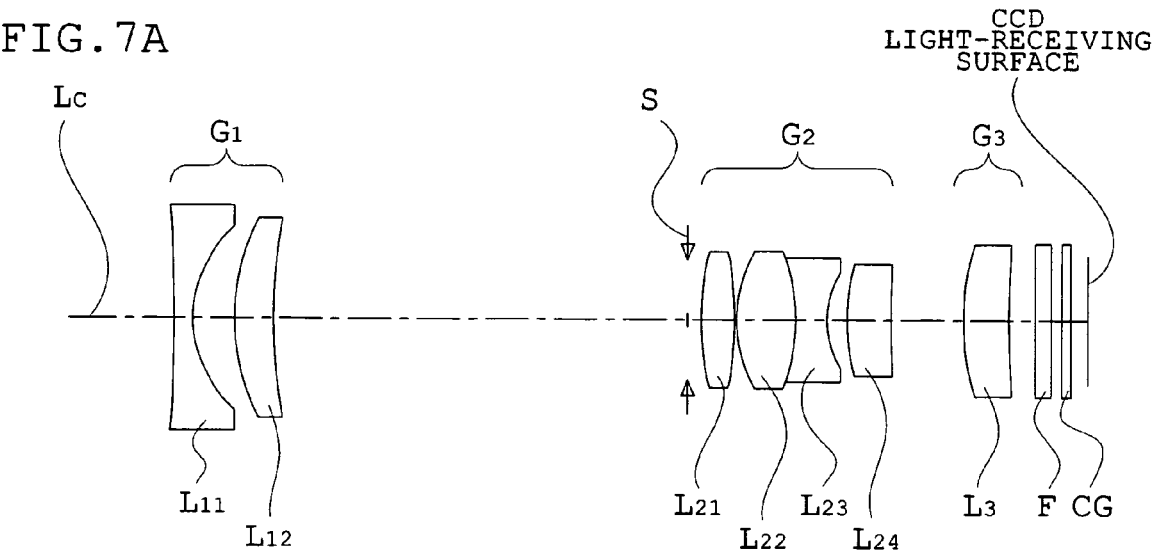
FIGS. 7A, 7B, and 7C are sectional views showing optical arrangements, developed along the optical axis, at wide-angle, middle, and telephoto positions, respectively, of the zoom lens in a fourth embodiment of the present invention.
Figure 7B:
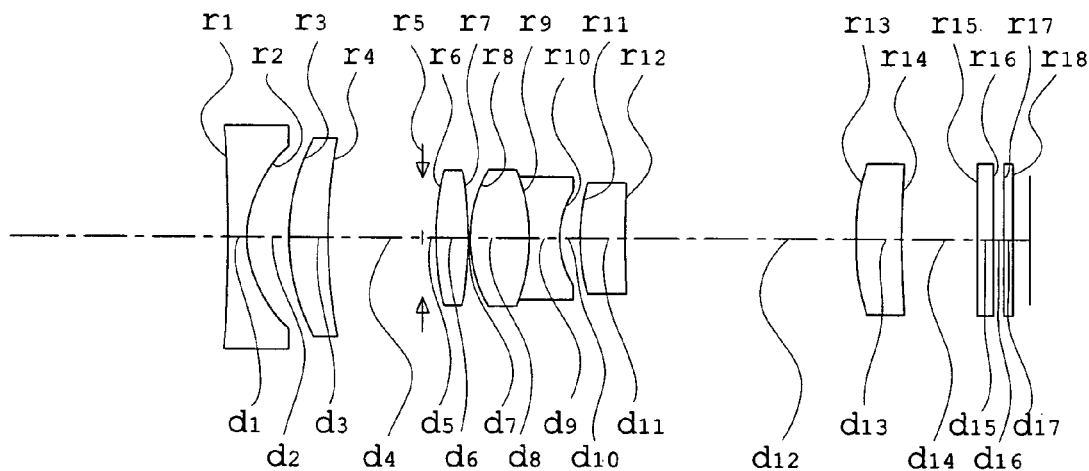
Figure 7C:
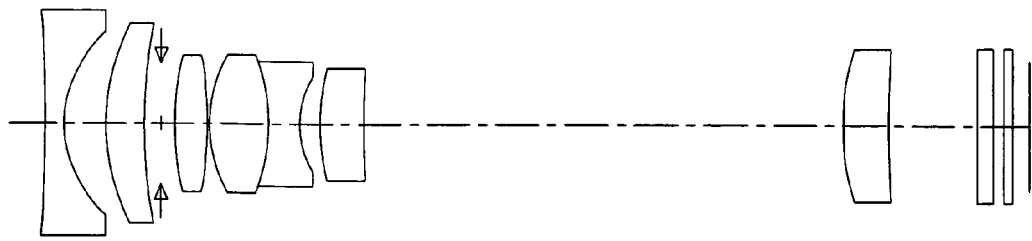
Figure 8A:
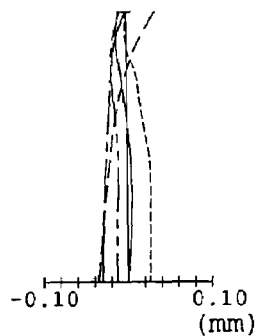
FIGS. 8A, 8B, 8C, and 8D are diagrams showing aberration characteristics at the wide-angle position of the zoom lens in the fourth embodiment.
Figure 8B:
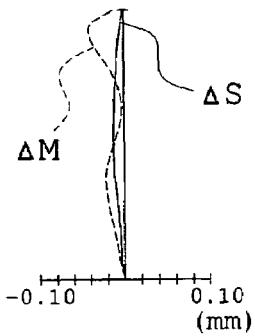
Figure 8C:
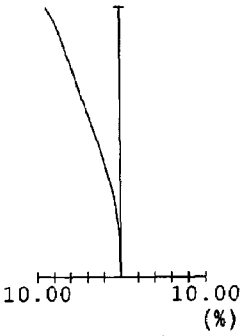
Figure 8D:
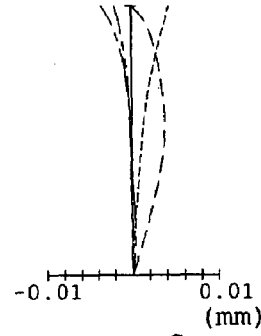
Figure 8E:
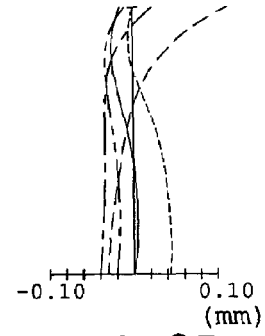
FIGS. 8E, 8F, 8G, and 8H are diagrams showing aberration characteristics at the middle position of the zoom lens in the fourth embodiment.
Figure 8F:
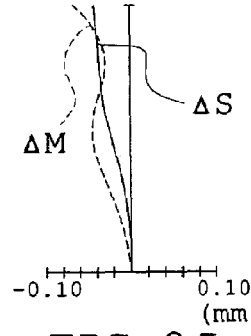
Figure 8G:
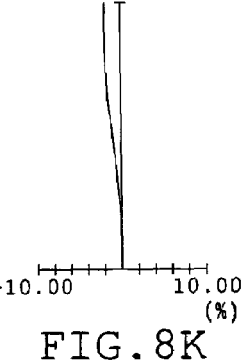
Figure 8H:
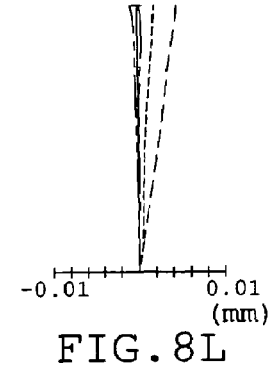
Figure 8I:
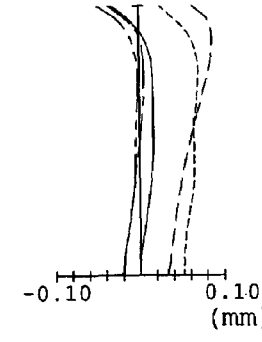
FIGS. 8I, 8J, 8K, and 8L are diagrams showing aberration characteristics at the telephoto position of the zoom lens in the fourth embodiment.
Figure 8J:
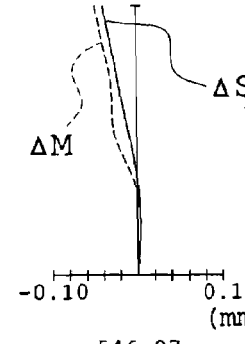
Figure 8K:
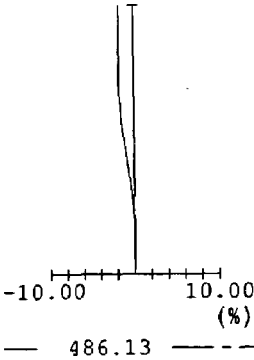
Figure 8L:
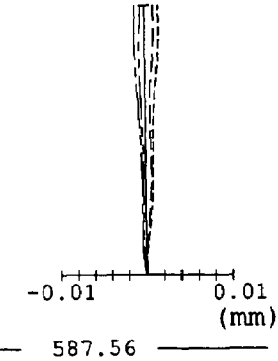

FIGS. 7A–7C show the arrangements of the zoom lens in this embodiment. FIGS. 8A–8L show aberration characteristics in the infinite object point focusing of the zoom lens of the fourth embodiment.

The zoom lens of the fourth embodiment, as shown in FIGS. 7A–7C, comprises the first lens unit $G_1$ with negative power, the second lens unit $G_2$ with positive power, and the third lens unit $G_3$ with positive power. The first lens unit $G_1$ includes the negative lens $L_{11}$ with a concave surface of strong curvature facing the image side and the positive lens $L_{12}$. The second lens unit $G_2$ includes the positive lens $L_{21}$, the cemented lens component of the positive lens $L_{22}$ and the negative lens $L_{23}$, arrange in this order, and the positive lens $L_{24}$. The third lens unit $G_3$ is constructed with the single positive lens component $L_3$. The first lens unit $G_1$, the second lens unit $G_2$, and the third lens unit $G_3$ can be moved independently along the optical axis $L_C$. Again, reference symbol S represents a stop and F represents filters such as an optical low-pass filter and an infrared cutoff filter. Reference symbol CG denotes a cover glass for an electronic image sensor such as a CCD or CMOS. In the zoom lens of the fourth embodiment constructed as mentioned above, the first lens unit $G_1$, the second lens unit $G_2$, and the third lens unit $G_3$ are moved along the optical axis $L_C$ and thereby the magnification change is carried out.

Subsequently, numerical data of lenses constituting the zoom lens in the fourth embodiment are shown below.

| Surface | RDY | THI | Nd | Vd |
|---|---|---|---|---|
| 1$ | −71.7842 | 1.1000 | 1.77377 | 47.17 |
| 2$ | 7.5287 | 2.5000 | 1 | |
| 3 | 12.9107 | 2.3003 | 1.84666 | 23.78 |
| 4 | 32.3200 | D4 | 1 | |
| Stop | ∞ | 0.8000 | 1 | |

-continued

| | | | | |
|---|---|---|---|---|
| 6$ | 14.4642 | 1.9406 | 1.58913 | 61.25 |
| 7$ | −35.0373 | 0.1000 | 1 | |
| 8 | 8.3746 | 3.5696 | 1.69680 | 55.53 |
| 9 | −11.4282 | 1.8000 | 1.80100 | 34.97 |
| 10 | 5.4359 | 1.2000 | 1 | |
| 11 | 13.3804 | 2.6000 | 1.72916 | 54.68 |
| 12 | 65.7185 | D12 | 1 | |
| 13$ | 15.1320 | 2.6492 | 1.48749 | 70.44 |
| 14$ | 289.1690 | D14 | 1 | |
| 15 | ∞ | 0.9500 | 1.54771 | 62.84 |
| 16 | ∞ | 0.6000 | 1 | |
| 17 | ∞ | 0.5000 | 1.51633 | 64.14 |
| 18 | ∞ | | | |

Aspherical coefficients

| Surface | RDY | K |
|---|---|---|
| 1 | −71.7842 | 0 |

| $A_4$ | $A_6$ | $A_8$ |
|---|---|---|
| 1.3281E−4 | −8.9083E−7 | −2.2591E−9 |

| Surface | RDY | K |
|---|---|---|
| 2 | 7.5287 | −0.2100 |

| $A_4$ | $A_6$ | $A_8$ | $A_{10}$ |
|---|---|---|---|
| −1.0273E−5 | 1.3895E−6 | −7.8538E−8 | −2.6185E−10 |

| Surface | RDY | K |
|---|---|---|
| 6 | 14.4642 | −14.9562 |

| $A_4$ | $A_6$ | $A_8$ | $A_{10}$ |
|---|---|---|---|
| 4.9678E−4 | −2.4302E−5 | 7.3888E−7 | −3.1054E−8 |

| Surface | RDY | K |
|---|---|---|
| 7 | −35.0373 | −0.1019 |

| $A_4$ | $A_6$ | $A_8$ | $A_{10}$ |
|---|---|---|---|
| −1.1737E−4 | −7.4090E−6 | 1.9176E−7 | −2.0363E−8 |

| Surface | RDY | K |
|---|---|---|
| 13 | 15.1320 | 0 |

| $A_4$ | $A_6$ | $A_8$ | $A_{10}$ |
|---|---|---|---|
| −1.1690E−3 | 1.0228E−4 | −4.0590E−6 | 7.2366E−8 |

| Surface | RDY | K |
|---|---|---|
| 14 | 289.1690 | 0 |

| $A_4$ | $A_6$ | $A_8$ | $A_{10}$ |
|---|---|---|---|
| −1.7860E−3 | 1.5734E−4 | −6.3550E−6 | 1.1393E−7 |

Zoom data

| | Wide-angle | Middle | Telephoto |
|---|---|---|---|
| Focal length | 6.12 | 16.0 | 29.4 |
| FNO | 2.50 | 3.84 | 5.86 |
| D4 | 24.42 | 5.59 | 1.00 |
| D12 | 4.28 | 12.19 | 28.18 |
| D14 | 1.55 | 4.47 | 5.20 |

$: Aspherical surface

Also, in the data of the above conditions, $|\beta_{2T}|=2.68$, $|f_1|/f_T=0.52$, $f_3/f_T=1.11$, and $|v_{22}-v_{23}|=20.56$.

Fifth Embodiment

Figure 9A:
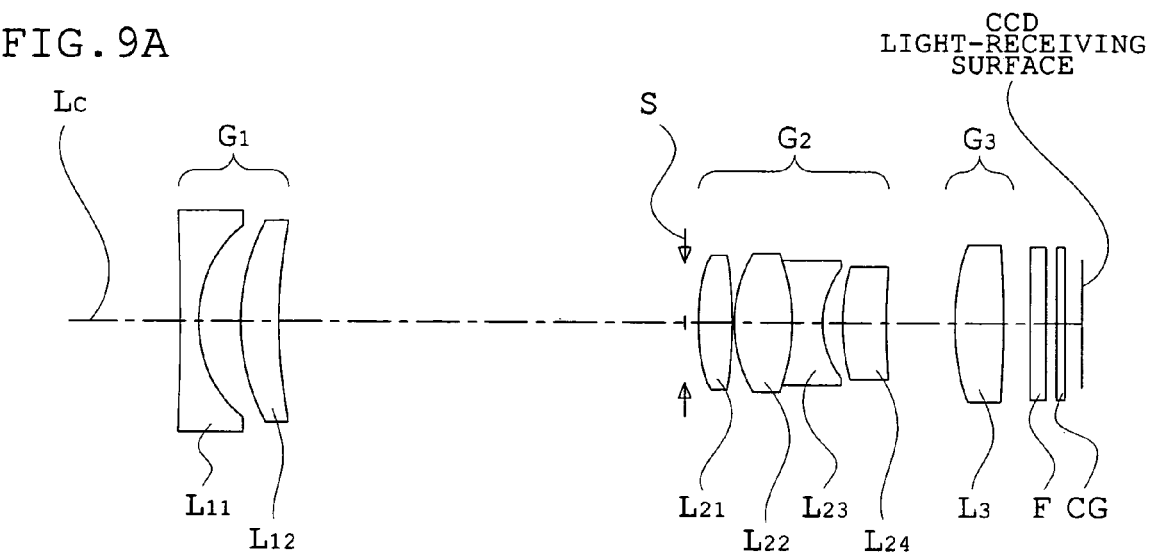
FIGS. 9A, 9B, and 9C are sectional views showing optical arrangements, developed along the optical axis, at wide-angle, middle, and telephoto positions, respectively, of the zoom lens in a fifth embodiment of the present invention.
Figure 9B:
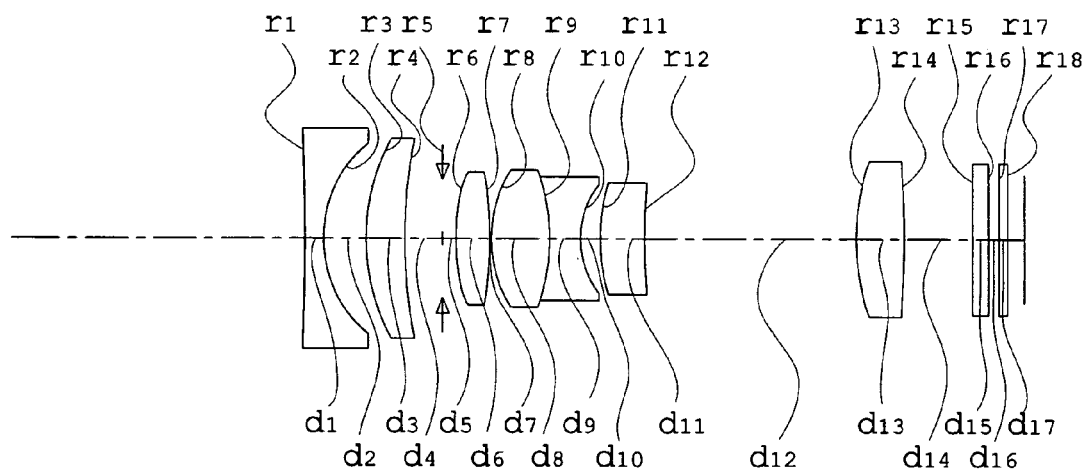
Figure 9C:
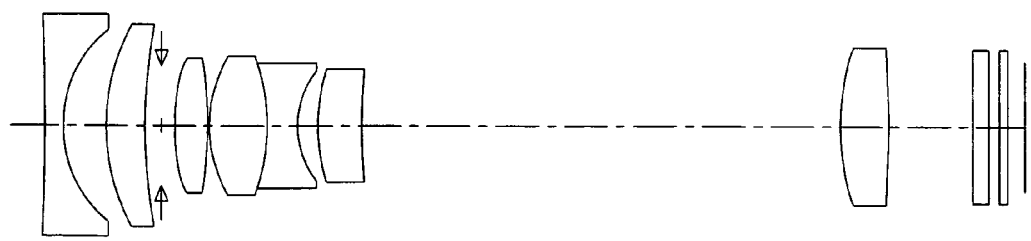
Figure 10A:
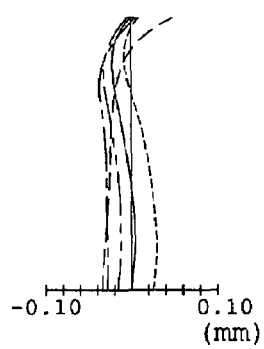
FIGS. 10A, 10B, 10C, and 10D are diagrams showing aberration characteristics at the wide-angle position of the zoom lens in the fifth embodiment.
Figure 10B:
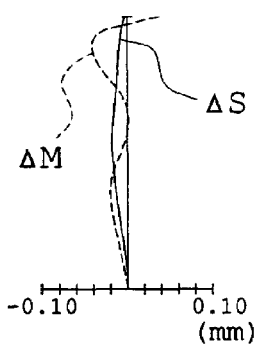
Figure 10C:
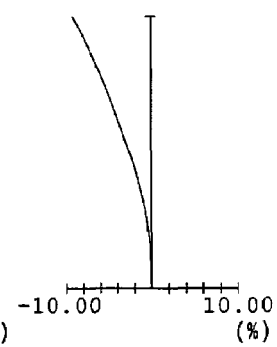
Figure 10D:
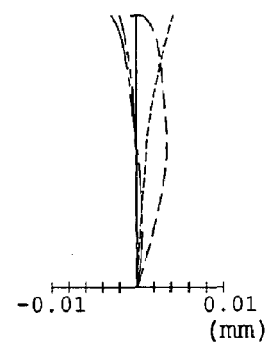
Figure 10E:
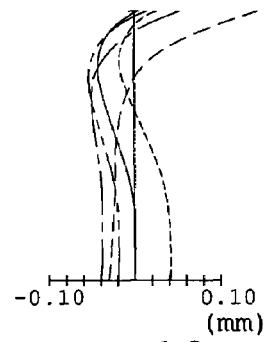
FIGS. 10E, 10F, 10G, and 10H are diagrams showing aberration characteristics at the middle position of the zoom lens in the fifth embodiment.
Figure 10F:
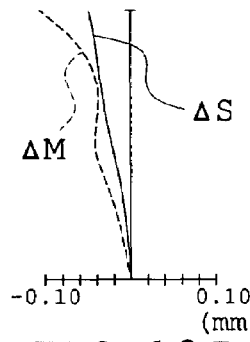
Figure 10G:
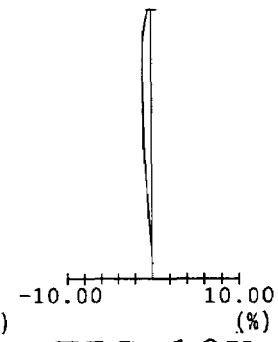
Figure 10H:
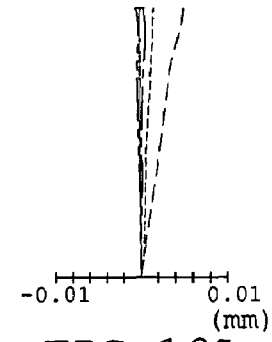
Figure 10I:
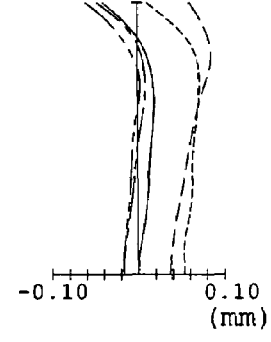
FIGS. 10I, 10J, 10K, and 10L are diagrams showing aberration characteristics at the telephoto position of the zoom lens in the fifth embodiment.
Figure 10J:
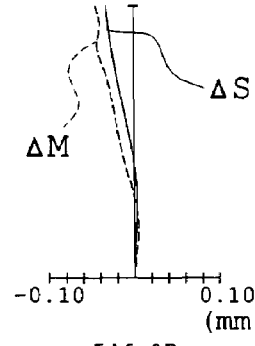
Figure 10K:
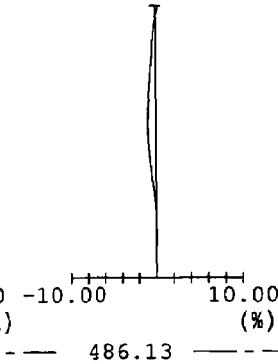
Figure 10L:
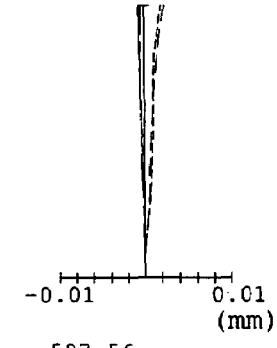

FIGS. 9A–9C show the arrangements of the zoom lens in this embodiment. FIGS. 10A–10L show aberration characteristics in the infinite object point focusing of the zoom lens of the fifth embodiment.

The zoom lens of the fifth embodiment, as shown in FIGS. 9A–9C, comprises the first lens unit $G_1$ with negative power, the second lens unit $G_2$ with positive power, and the third lens unit $G_3$ with positive power. The first lens unit $G_1$ includes the negative lens $L_{11}$ with a concave surface of strong curvature facing the image side and the positive lens $L_{12}$. The second lens unit $G_2$ includes the positive lens $L_{21}$, the cemented lens component of the positive lens $L_{22}$ and the negative lens $L_{23}$, arrange in this order, and the positive lens $L_{24}$. The third lens unit $G_3$ is constructed with the single positive lens component $L_3$. The first lens unit $G_1$, the second lens unit $G_2$, and the third lens unit $G_3$ can be moved independently along the optical axis $L_C$. Again, reference symbol S represents a stop and F represents filters such as an optical low-pass filter and an infrared cutoff filter. Reference symbol CG denotes a cover glass for an electronic image sensor such as a CCD or CMOS. In the zoom lens of the fifth embodiment constructed as mentioned above, the first lens unit $G_1$, the second lens unit $G_2$, and the third lens unit $G_3$ are moved along the optical axis $L_C$ and thereby the magnification change is carried out.

Subsequently, numerical data of lenses constituting the zoom lens in the fifth embodiment are shown below.

| Surface | RDY | THI | Nd | Vd |
|---|---|---|---|---|
| 1 | −162.9635 | 1.1000 | 1.77377 | 47.17 |
| 2$ | 7.0981 | 2.5000 | 1 | |
| 3 | 12.7928 | 2.3000 | 1.84666 | 23.78 |
| 4 | 31.4308 | D4 | 1 | |
| Stop | ∞ | 0.8000 | 1 | |
| 6$ | 14.3834 | 1.9731 | 1.58913 | 61.25 |
| 7$ | −37.1198 | 0.1000 | 1 | |
| 8 | 8.1872 | 3.4338 | 1.69680 | 55.53 |
| 9 | −12.1414 | 1.8000 | 1.80100 | 34.97 |
| 10 | 5.3637 | 1.2000 | 1 | |
| 11 | 12.2313 | 2.6000 | 1.72916 | 54.68 |
| 12 | 46.3160 | D12 | 1 | |
| 13$ | 16.0438 | 2.8931 | 1.48749 | 70.44 |
| 14$ | −413.3154 | D14 | 1 | |
| 15 | ∞ | 0.9500 | 1.54771 | 62.84 |
| 16 | ∞ | 0.6000 | 1 | |
| 17 | ∞ | 0.5000 | 1.51633 | 64.14 |
| 18 | ∞ | | | |

Aspherical coefficients

| Surface | RDY | K |
|---|---|---|
| 2 | 7.0981 | −0.2100 |

| $A_4$ | $A_6$ | $A_8$ | $A_{10}$ |
|---|---|---|---|
| −1.9181E−4 | 1.3698E−6 | −1.4998E−7 | 1.3783E−9 |

| Surface | RDY | K |
|---|---|---|
| 6 | 14.3834 | −14.9562 |

| $A_4$ | $A_6$ | $A_8$ | $A_{10}$ |
|---|---|---|---|
| 5.0864E−4 | −2.0484E−5 | 7.2324E−7 | −3.2492E−8 |

-continued

| Surface | RDY | K | |
|---|---|---|---|
| 7 | −37.1198 | −0.1019 | |
| $A_4$ | $A_6$ | $A_8$ | $A_{10}$ |
| −1.1930E−4 | −2.8075E−6 | 1.5052E−7 | −2.1677E−8 |

| Surface | RDY | K | |
|---|---|---|---|
| 13 | 16.0438 | 0 | |
| $A_4$ | $A_6$ | $A_8$ | $A_{10}$ |
| −1.0783E−3 | 1.0681E−4 | −4.0356E−6 | 6.9484E−8 |

| Surface | RDY | K | |
|---|---|---|---|
| 14 | −413.3154 | 0 | |
| $A_4$ | $A_6$ | $A_8$ | $A_{10}$ |
| −1.6528E−3 | 1.6592E−4 | −6.3751E−6 | 1.1240E−7 |

Zoom data

| | Wide-angle | Middle | Telephoto |
|---|---|---|---|
| Focal length | 6.12 | 16.0 | 29.4 |
| FNO | 2.48 | 3.84 | 5.84 |
| D4 | 24.04 | 5.65 | 1.00 |
| D12 | 4.11 | 12.56 | 28.29 |
| D14 | 1.55 | 4.00 | 4.95 |

$: Aspherical surface

Also, in the data of the above conditions, $|\beta 2T|=2.69$, $|f1|/fT=0.52$, $f3/fT=1.08$, and $|v_{22}-v_{23}|=20.56$.

Sixth Embodiment

Figure 11A:
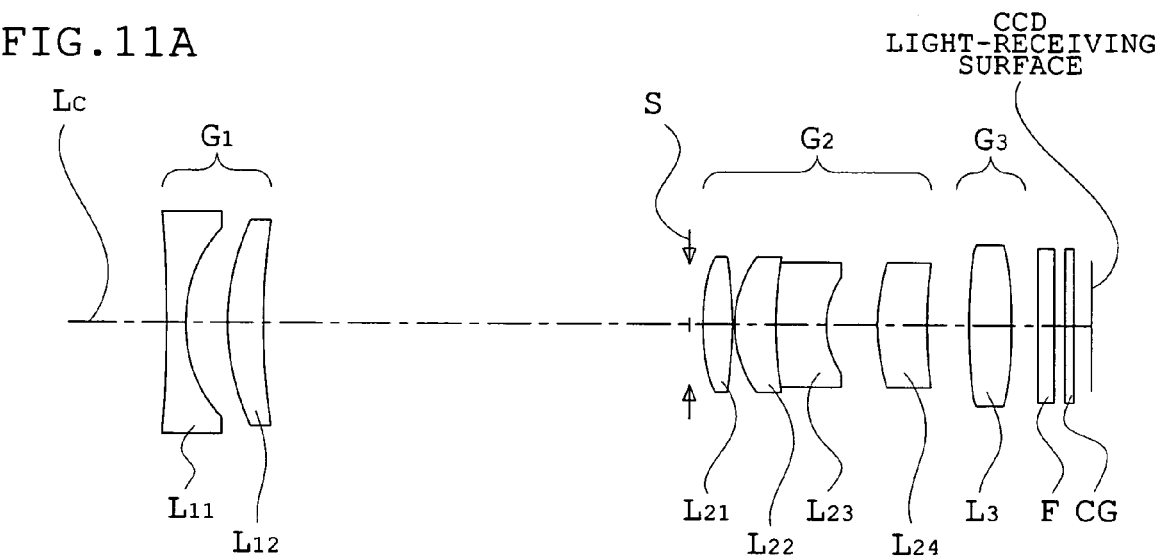
FIGS. 11A, 11B, and 11C are sectional views showing optical arrangements, developed along the optical axis, at wide-angle, middle, and telephoto positions, respectively, of the zoom lens in a sixth embodiment of the present invention.
Figure 11B:
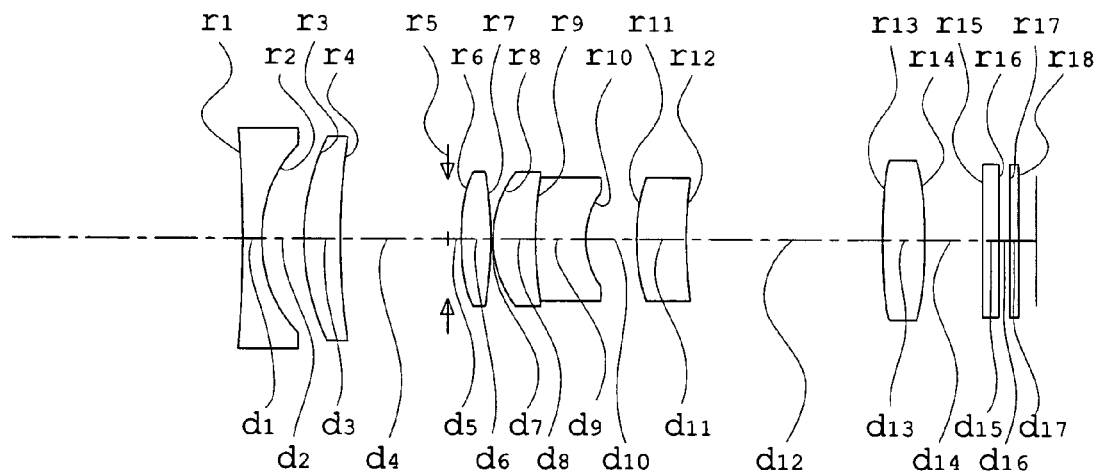
Figure 11C:
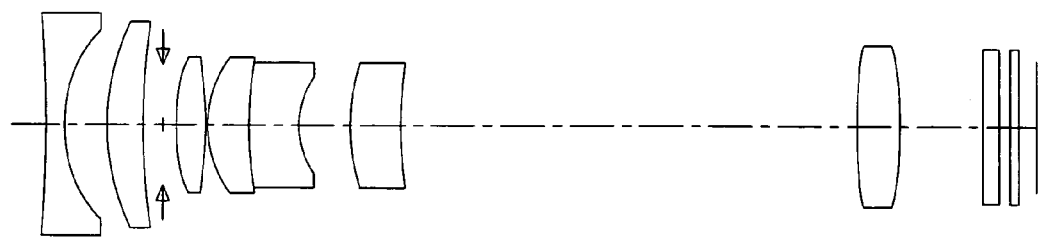
Figure 12A:
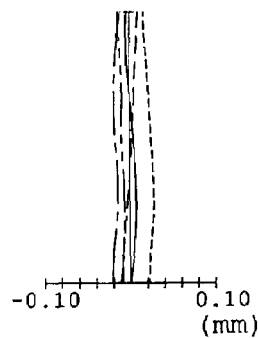
FIGS. 12A, 12B, 12C, and 12D are diagrams showing aberration characteristics at the wide-angle position of the zoom lens in the sixth embodiment.
Figure 12B:
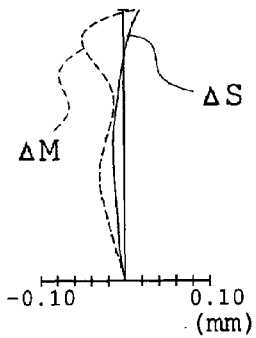
Figure 12C:
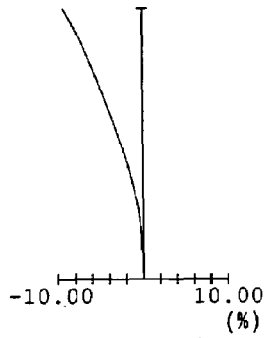
Figure 12D:
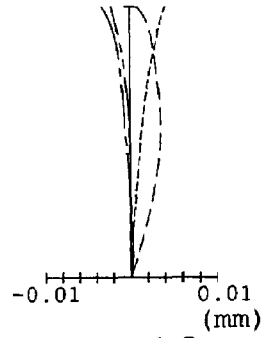
Figure 12E:
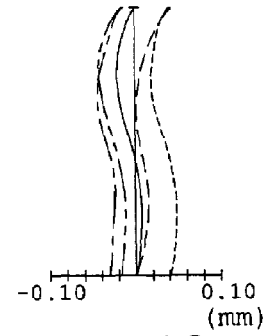
FIGS. 12E, 12F, 12G, and 12H are diagrams showing aberration characteristics at the middle position of the zoom lens in the sixth embodiment.
Figure 12F:
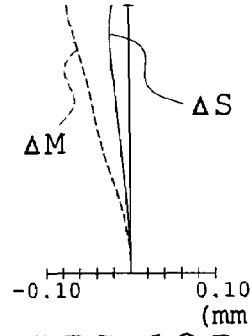
Figure 12G:
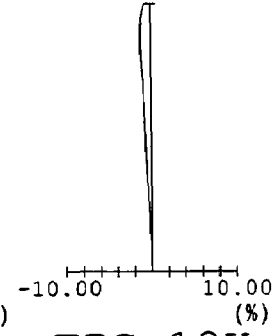
Figure 12H:
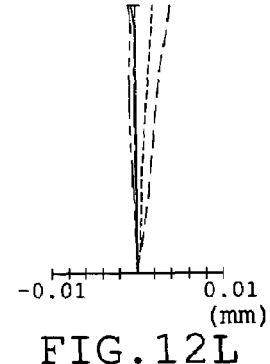
Figure 12I:
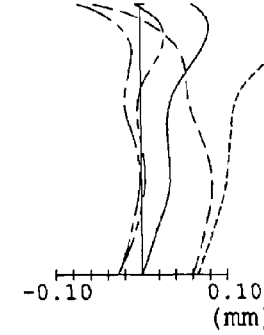
FIGS. 12I, 12J, 12K, and 12L are diagrams showing aberration characteristics at the telephoto position of the zoom lens in the sixth embodiment.
Figure 12J:
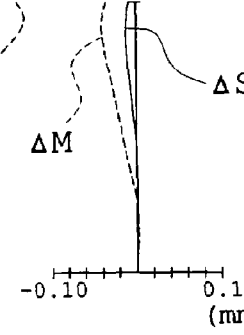
Figure 12K:
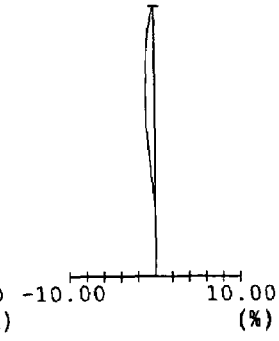
Figure 12L:
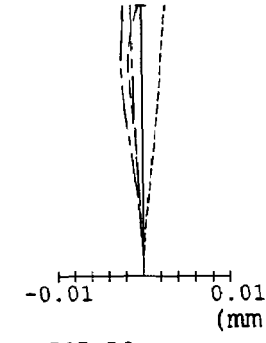

FIGS. 11A–11C show the arrangements of the zoom lens in this embodiment. FIGS. 12A–12L show aberration characteristics in the infinite object point focusing of the zoom lens of the sixth embodiment.

The zoom lens of the sixth embodiment, as shown in FIGS. 11A–11C, comprises the first lens unit $G_1$ with negative power, the second lens unit $G_2$ with positive power, and the third lens unit $G_3$ with positive power. The first lens unit $G_1$ includes the negative lens $L_{11}$ with a concave surface of strong curvature facing the image side and the positive lens $L_{12}$. The second lens unit $G_2$ includes the positive lens $L_{21}$, the cemented lens component of the positive lens $L_{22}$ and the negative lens $L_{23}$, arrange in this order, and the positive lens $L_{24}$. The third lens unit $G_3$ is constructed with the single positive lens component $L_3$. The first lens unit $G_1$, the second lens unit $G_2$, and the third lens unit $G_3$ can be moved independently along the optical axis $L_C$. Again, reference symbol S represents a stop and F represents filters such as an optical low-pass filter and an infrared cutoff filter. Reference symbol CG denotes a cover glass for an electronic image sensor such as a CCD or CMOS. In the zoom lens of the sixth embodiment constructed as mentioned above, the first lens unit $G_1$, the second lens unit $G_2$, and the third lens unit $G_3$ are moved along the optical axis $L_C$ and thereby the magnification change is carried out.

Subsequently, numerical data of lenses constituting the zoom lens in the sixth embodiment are shown below.

| Surface | RDY | THI | Nd | Vd |
|---|---|---|---|---|
| 1 | −76.8654 | 1.1000 | 1.76800 | 49.24 |
| 2$ | 7.4108 | 2.5000 | 1 | |
| 3 | 14.0757 | 2.1293 | 1.84666 | 23.78 |
| 4 | 41.4176 | D4 | 1 | |
| Stop | ∞ | 0.8000 | 1 | |
| 6$ | 13.7990 | 1.7500 | 1.69350 | 53.20 |
| 7$ | −50.2826 | 0.1000 | 1 | |
| 8 | 6.7747 | 2.4500 | 1.48749 | 70.23 |
| 9 | 24.2442 | 2.9616 | 1.84666 | 23.78 |
| 10 | 4.9991 | 3.0000 | 1 | |
| 11 | 12.4312 | 2.9000 | 1.80610 | 40.90 |
| 12 | 27.2223 | D12 | 1 | |
| 13$ | 24.1955 | 2.4802 | 1.58313 | 59.46 |
| 14$ | −54.5901 | D14 | 1 | |
| 15 | ∞ | 0.9500 | 1.54771 | 62.84 |
| 16 | ∞ | 0.6000 | 1 | |
| 17 | ∞ | 0.5000 | 1.51633 | 64.14 |
| 18 | ∞ | | | |

Aspherical coefficients

| Surface | RDY | K | |
|---|---|---|---|
| 2 | 7.4108 | −0.2100 | |
| $A_4$ | $A_6$ | $A_8$ | $A_{10}$ |
| −2.1674E−4 | 1.3768E−6 | −1.2739E−7 | 1.0989E−9 |

| Surface | RDY | K | |
|---|---|---|---|
| 6 | 13.7990 | −14.9562 | |
| $A_4$ | $A_6$ | $A_8$ | $A_{10}$ |
| 7.3613E−4 | −1.6406E−5 | 5.4791E−7 | 8.5828E−9 |

| Surface | RDY | K | |
|---|---|---|---|
| 7 | −50.2826 | −0.1019 | |
| $A_4$ | $A_6$ | $A_8$ | $A_{10}$ |
| 1.1101E−4 | 5.5106E−6 | −9.8595E−8 | 2.2222E−8 |

| Surface | RDY | K | |
|---|---|---|---|
| 13 | 24.1955 | 0 | |
| $A_4$ | $A_6$ | $A_8$ | $A_{10}$ |
| −1.0800E−3 | 5.1316E−5 | −1.1275E−6 | 2.2800E−8 |

| Surface | RDY | K | |
|---|---|---|---|
| 14 | −54.5901 | 0 | |
| $A_4$ | $A_6$ | $A_8$ | $A_{10}$ |
| −1.4693E−3 | 8.1671E−5 | −2.2999E−6 | 4.6265E−8 |

Zoom data

| | Wide-angle | Middle | Telephoto |
|---|---|---|---|
| Focal length | 6.12 | 16.0 | 29.4 |
| FNO | 2.52 | 3.93 | 5.91 |
| D4 | 24.94 | 6.22 | 1.20 |
| D12 | 2.48 | 11.53 | 26.73 |
| D14 | 1.55 | 3.38 | 4.84 |

$: Aspherical surface

Also, in the data of the above conditions, $|\beta 2T|=2.65$, $|f1|/fT=0.53$, $f3/fT=0.98$, and $|v_{22}-v_{23}|=46.45$.

Seventh Embodiment

Figure 13A:
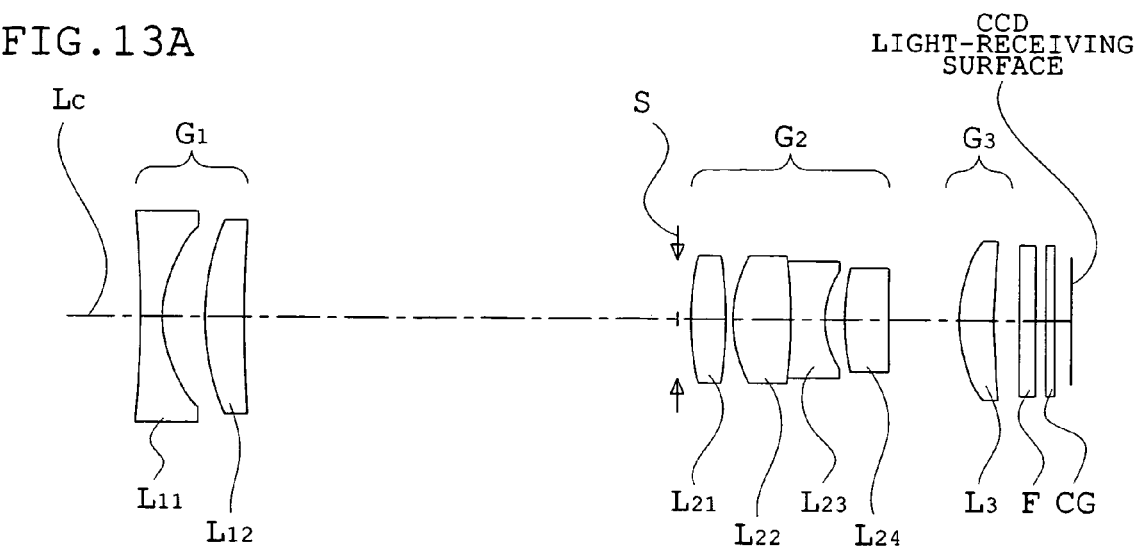
FIGS. 13A, 13B, and 13C are sectional views showing optical arrangements, developed along the optical axis, at wide-angle, middle, and telephoto positions, respectively, of the zoom lens in a seventh embodiment of the present invention.
Figure 13B:
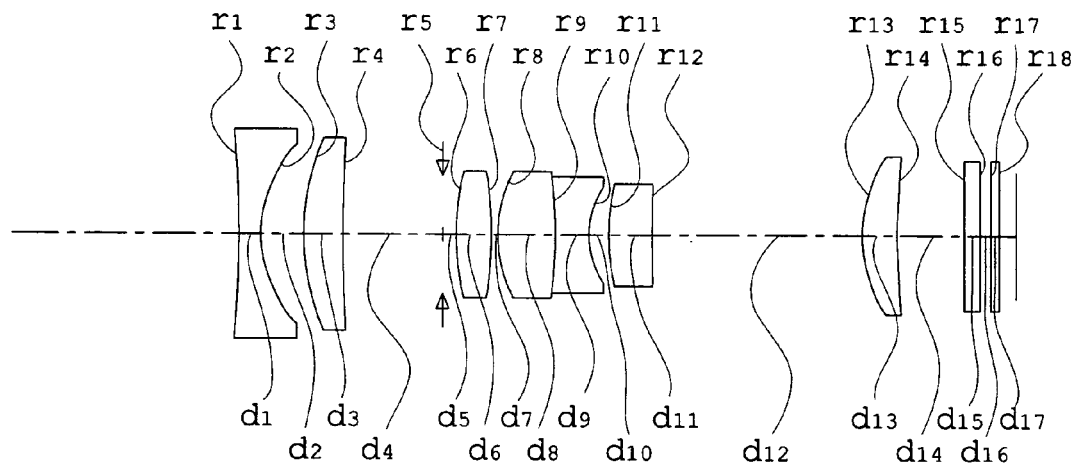
Figure 13C:
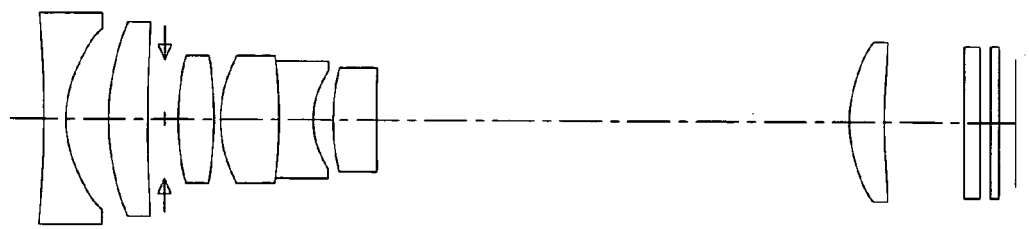
Figure 14A:
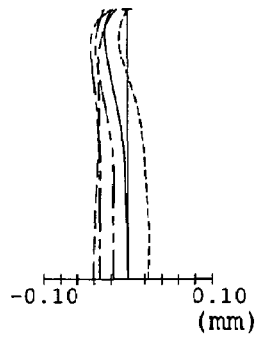
FIGS. 14A, 14B, 14C, and 14D are diagrams showing aberration characteristics at the wide-angle position of the zoom lens in the seventh embodiment.
Figure 14B:
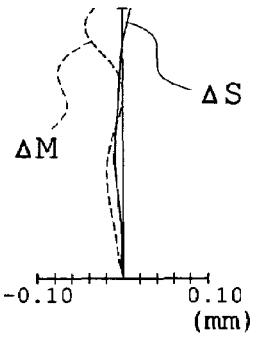
Figure 14C:
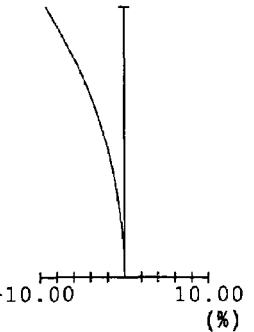
Figure 14D:
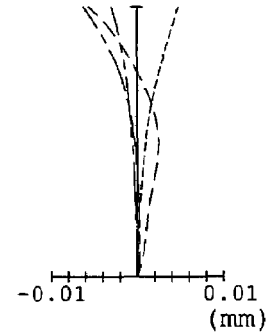
Figure 14E:
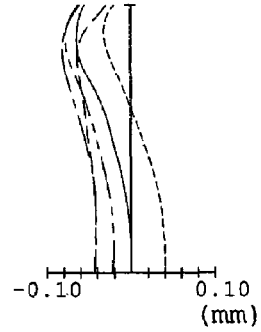
FIGS. 14E, 14F, 14G, and 14H are diagrams showing aberration characteristics at the middle position of the zoom lens in the seventh embodiment.
Figure 14F:
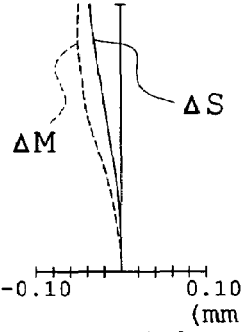
Figure 14G:
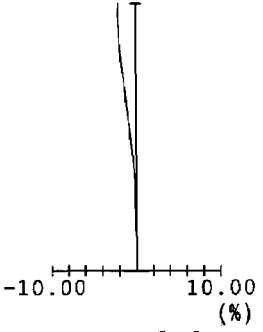
Figure 14H:
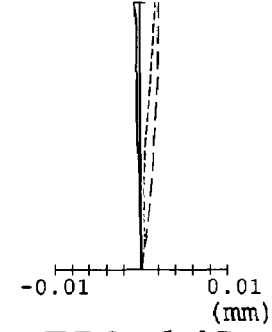
Figure 14I:
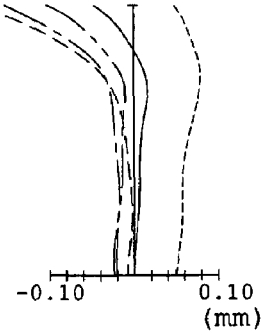
FIGS. 14I, 14J, 14K, and 14L are diagrams showing aberration characteristics at the telephoto position of the zoom lens in the seventh embodiment.
Figure 14J:
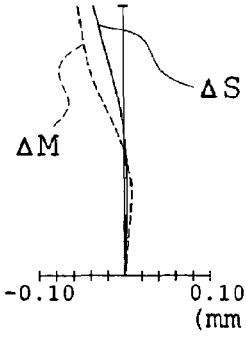
Figure 14K:
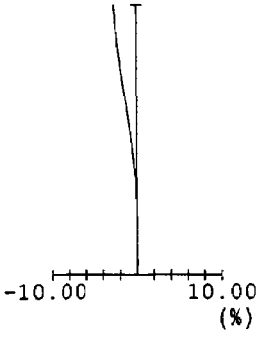
Figure 14L:
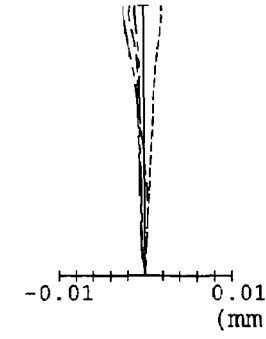

FIGS. 13A–13C show the arrangements of the zoom lens in this embodiment. FIGS. 14A–14L show aberration characteristics in the infinite object point focusing of the zoom lens of the seventh embodiment.

The zoom lens of the seventh embodiment, as shown in FIGS. 13A–13C, comprises the first lens unit $G_1$ with negative power, the second lens unit $G_2$ with positive power, and the third lens unit $G_3$ with positive power. The first lens unit $G_1$ includes the negative lens $L_{11}$ with a concave surface of strong curvature facing the image side and the positive lens $L_{12}$. The second lens unit $G_2$ includes the positive lens $L_{21}$, the cemented lens component of the positive lens $L_{22}$ and the negative lens $L_{23}$, arrange in this order, and the positive lens $L_{24}$. The third lens unit $G_3$ is constructed with the single positive lens component $L_3$. The first lens unit $G_1$, the second lens unit $G_2$, and the third lens unit $G_3$ can be moved independently along the optical axis $L_C$. Again, reference symbol S represents a stop and F represents filters such as an optical low-pass filter and an infrared cutoff filter. Reference symbol CG denotes a cover glass for an electronic image sensor such as a CCD or CMOS. In the zoom lens of the seventh embodiment constructed as mentioned above, the first lens unit $G_1$, the second lens unit $G_2$, and the third lens unit $G_3$ are moved along the optical axis $L_C$ and thereby the magnification change is carried out.

Subsequently, numerical data of lenses constituting the zoom lens in the seventh embodiment are shown below.

| Surface | RDY | THI | Nd | Vd |
|---|---|---|---|---|
| 1 | −69.8941 | 1.3000 | 1.86100 | 40.73 |
| 2$ | 7.2690 | 2.5479 | 1 | |
| 3 | 15.1334 | 2.3332 | 1.84666 | 23.78 |
| 4 | 96.7893 | D4 | 1 | |
| Stop | ∞ | 0.8000 | 1 | |
| 6$ | 13.2514 | 2.1225 | 1.58913 | 61.25 |
| 7$ | −31.8620 | 0.3846 | 1 | |
| 8 | 8.1260 | 3.5000 | 1.67790 | 55.34 |
| 9 | −28.9813 | 2.0000 | 1.90366 | 31.31 |
| 10 | 5.3172 | 1.2001 | 1 | |
| 11 | 14.3446 | 2.6000 | 1.72000 | 46.20 |
| 12 | 151.6777 | D12 | 1 | |
| 13$ | 10.8450 | 2.0893 | 1.49700 | 81.61 |
| 14$ | 32.1577 | D14 | 1 | |
| 15 | ∞ | 0.9500 | 1.54771 | 62.84 |
| 16 | ∞ | 0.6000 | 1 | |
| 17 | ∞ | 0.5000 | 1.51633 | 64.14 |
| 18 | ∞ | | | |

| Aspherical coefficients | | | |
|---|---|---|---|
| Surface | RDY | | K |
| 2 | 7.2690 | | −0.2100 |
| $A_4$ | $A_6$ | $A_8$ | $A_{10}$ |
| −2.4460E−4 | −1.3274E−7 | −8.1816E−8 | 3.3658E−10 |
| Surface | RDY | | K |
| 6 | 13.2514 | | −14.9562 |
| $A_4$ | $A_6$ | $A_8$ | $A_{10}$ |
| 5.8396E−4 | −3.6513E−5 | 1.3443E−6 | −5.2218E−8 |
| Surface | RDY | | K |
| 7 | −31.8620 | | −0.1019 |
| $A_4$ | $A_6$ | $A_8$ | $A_{10}$ |
| −2.0316E−4 | −8.9653E−6 | 3.2982E−7 | −2.9683E−8 |
| Surface | RDY | | K |
| 13 | 10.8450 | | 0 |
| $A_4$ | $A_6$ | $A_8$ | $A_{10}$ |
| −6.9496E−4 | 4.8793E−5 | −1.2248E−6 | 1.9803E−8 |
| Surface | RDY | | K |
| 14 | 32.1577 | | 0 |
| $A_4$ | $A_6$ | $A_8$ | $A_{10}$ |
| −1.0925E−3 | 7.4952E−5 | −1.9895E−6 | 3.1831E−8 |

| Zoom data | | | |
|---|---|---|---|
| | Wide-angle | Middle | Telephoto |
| Focal length | 6.12 | 16.0 | 29.4 |
| FNO | 2.57 | 3.98 | 6.08 |
| D4 | 25.93 | 5.98 | 1.00 |
| D12 | 4.23 | 12.53 | 28.27 |
| D14 | 1.55 | 4.04 | 4.79 |

$: Aspherical surface

Also, in the data of the above conditions, $|\beta 2T|=2.56$, $|f1|/fT=0.55$, $f3/fT=1.08$, and $|v_{22}-v_{23}|=24.03$.

Eighth Embodiment

Figure 15A:
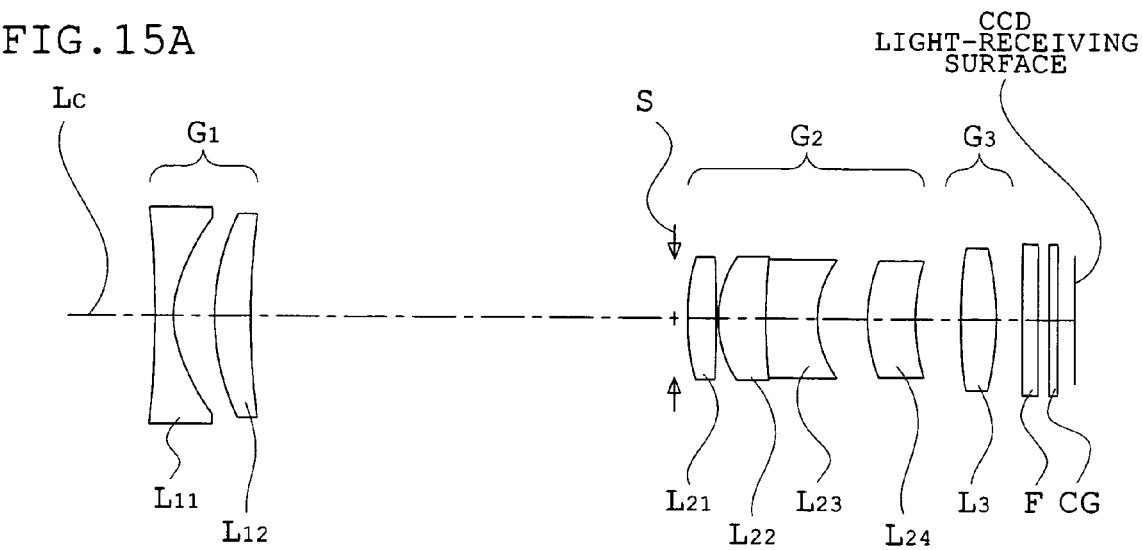
FIGS. 15A, 15B, and 15C are sectional views showing optical arrangements, developed along the optical axis, at wide-angle, middle, and telephoto positions, respectively, of the zoom lens in an eighth embodiment of the present invention.
Figure 15B:
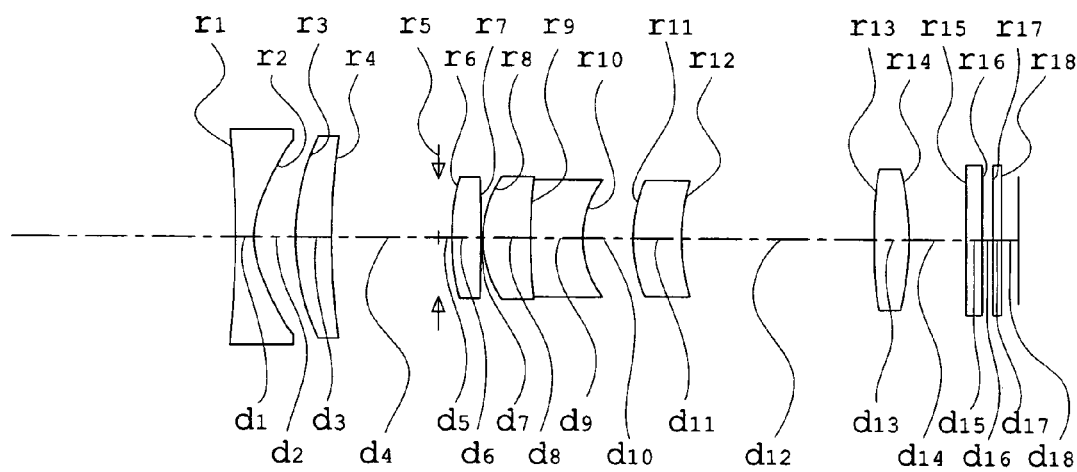
Figure 15C:
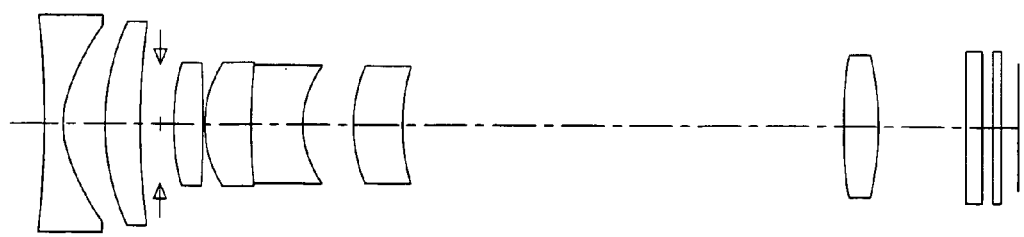
Figure 16A:
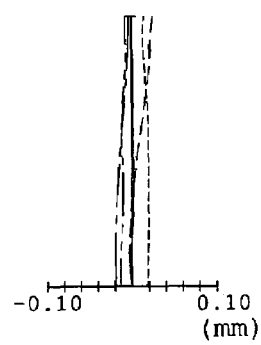
FIGS. 16A, 16B, 16C, and 16D are diagrams showing aberration characteristics at the wide-angle position of the zoom lens in the eighth embodiment.
Figure 16B:
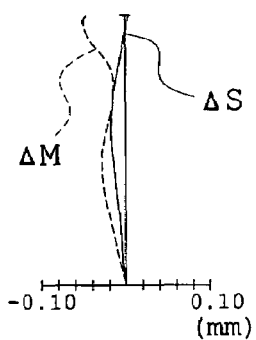
Figure 16C:
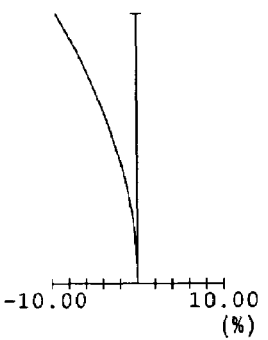
Figure 16D:
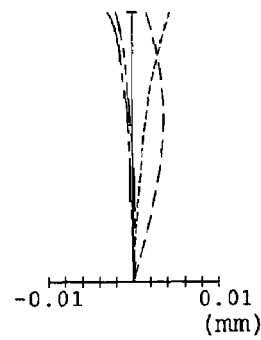
Figure 16E:
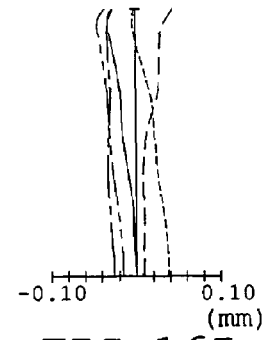
FIGS. 16E, 16F, 16G and 16H are diagrams showing aberration characteristics at the middle position of the zoom lens in the eighth embodiment.
Figure 16F:
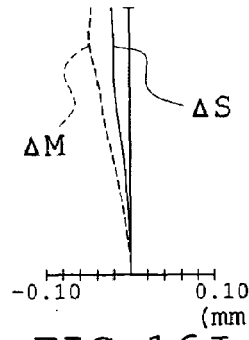
Figure 16G:
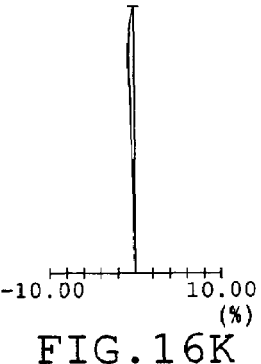
Figure 16H:
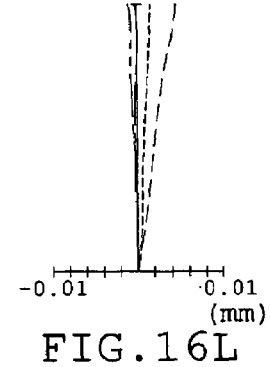
Figure 16I:
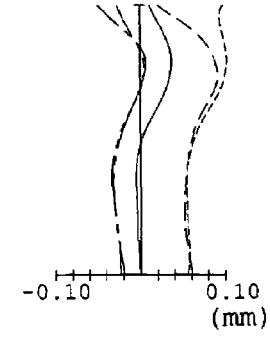
FIGS. 16I, 16J, 16K, and 16L are diagrams showing aberration characteristics at the telephoto position of the zoom lens in the eighth embodiment.
Figure 16J:
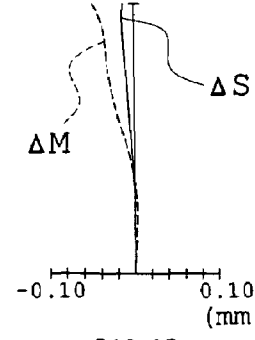
Figure 16K:
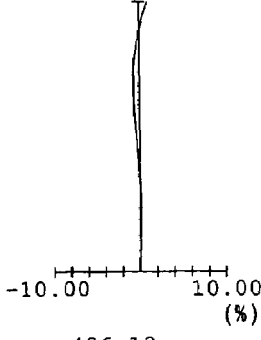
Figure 16L:
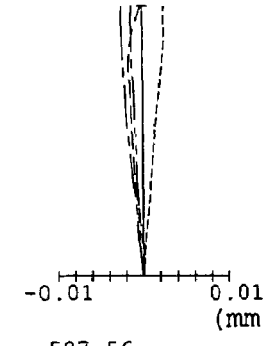

FIGS. 15A–15C show the arrangements of the zoom lens in this embodiment. FIGS. 16A–16L show aberration characteristics in the infinite object point focusing of the zoom lens of the eighth embodiment.

The zoom lens of the eighth embodiment, as shown in FIGS. 15A–15C, comprises the first lens unit $G_1$ with negative power, the second lens unit $G_2$ with positive power, and the third lens unit $G_3$ with positive power. The first lens unit $G_1$ includes the negative lens $L_{11}$ with a concave surface of strong curvature facing the image side and the positive lens $L_{12}$. The second lens unit $G_2$ includes the positive lens $L_{21}$, the cemented lens component of the positive lens $L_{22}$ and the negative lens $L_{23}$, arrange in this order, and the positive lens $L_{24}$. The third lens unit $G_3$ is constructed with the single positive lens component $L_3$. The first lens unit $G_1$, the second lens unit $G_2$, and the third lens unit $G_3$ can be moved independently along the optical axis $L_C$. Again, reference symbol S represents a stop and F represents filters such as an optical low-pass filter and an infrared cutoff filter. Reference symbol CG denotes a cover glass for an electronic image sensor such as a CCD or CMOS. In the zoom lens of the eighth embodiment constructed as mentioned above, the first lens unit $G_1$, the second lens unit $G_2$, and the third lens unit $G_3$ are moved along the optical axis $L_C$ and thereby the magnification change is carried out.

Subsequently, numerical data of lenses constituting the zoom lens in the eighth embodiment are shown below.

| Surface | RDY | THI | Nd | Vd |
|---|---|---|---|---|
| 1 | −69.9579 | 1.1000 | 1.76800 | 49.24 |
| 2$ | 7.5815 | 2.5000 | 1 | |
| 3 | 14.4505 | 2.1372 | 1.84666 | 23.78 |
| 4 | 45.3315 | D4 | 1 | |
| Stop | ∞ | 0.8000 | 1 | |
| 6$ | 13.8143 | 1.7500 | 1.69350 | 53.20 |
| 7$ | −283.9706 | 0.1000 | 1 | |
| 8 | 6.8697 | 2.7940 | 1.48749 | 70.23 |
| 9 | 36.8382 | 3.1000 | 1.84666 | 23.78 |
| 10 | 5.9376 | 2.9948 | 1 | |
| 11$ | 8.5549 | 2.9000 | 1.80610 | 40.73 |
| 12 | 12.5272 | D12 | 1 | |
| 13$ | 34.1994 | 2.1173 | 1.58313 | 59.46 |
| 14$ | −31.9012 | D14 | 1 | |
| 15 | ∞ | 0.9500 | 1.54771 | 62.84 |
| 16 | ∞ | 0.6000 | 1 | |
| 17 | ∞ | 0.5000 | 1.51633 | 64.14 |
| 18 | ∞ | | | |

Aspherical coefficients

| Surface | RDY | K |
|---|---|---|
| 2 | 7.5815 | −0.2100 |

| $A_4$ | $A_6$ | $A_8$ | $A_{10}$ |
|---|---|---|---|
| −2.0239E−4 | 5.1004E−7 | −7.9229E−8 | 4.0844E−10 |

| Surface | RDY | K |
|---|---|---|
| 6 | 13.8143 | −14.9562 |

| $A_4$ | $A_6$ | $A_8$ | $A_{10}$ |
|---|---|---|---|
| 8.1913E−4 | −1.1768E−5 | 6.3499E−7 | 7.1785E−9 |

| Surface | RDY | K |
|---|---|---|
| 7 | −283.9706 | −0.1019 |

| $A_4$ | $A_6$ | $A_8$ | $A_{10}$ |
|---|---|---|---|
| 1.7201E−4 | 1.3606E−5 | −2.6313E−7 | 3.2648E−8 |

| Surface | RDY | K |
|---|---|---|
| 11 | 8.5549 | 0 |

| $A_4$ | $A_6$ | $A_8$ | $A_{10}$ |
|---|---|---|---|
| −2.6570E−4 | −4.0829E−6 | −1.1997E−7 | 0 |

| Surface | RDY | K |
|---|---|---|
| 13 | 34.1994 | 0 |

| $A_4$ | $A_6$ | $A_8$ | $A_{10}$ |
|---|---|---|---|
| −1.1368E−3 | 6.0230E−5 | −7.5498E−7 | 1.6295E−8 |

| Surface | RDY | K |
|---|---|---|
| 14 | −31.9012 | 0 |

| $A_4$ | $A_6$ | $A_8$ | $A_{10}$ |
|---|---|---|---|
| −1.3803E−3 | 8.3402E−5 | −1.8808E−6 | 4.7716E−8 |

Zoom data

| | Wide-angle | Middle | Telephoto |
|---|---|---|---|
| Focal length | 6.12 | 16.0 | 29.4 |
| FNO | 2.65 | 4.12 | 6.18 |

-continued

| | | | |
|---|---|---|---|
| D4 | 25.20 | 6.33 | 1.20 |
| D12 | 2.75 | 11.52 | 26.25 |
| D14 | 1.55 | 3.41 | 5.20 |

$: Aspherical surface

Also, in the data of the above conditions, $|\beta 2T|=2.64$, $|f1|/fT=0.53$, $f3/fT=0.97$, and $|v_{22}-v_{23}|=46.45$.

Ninth Embodiment

Figure 17A:
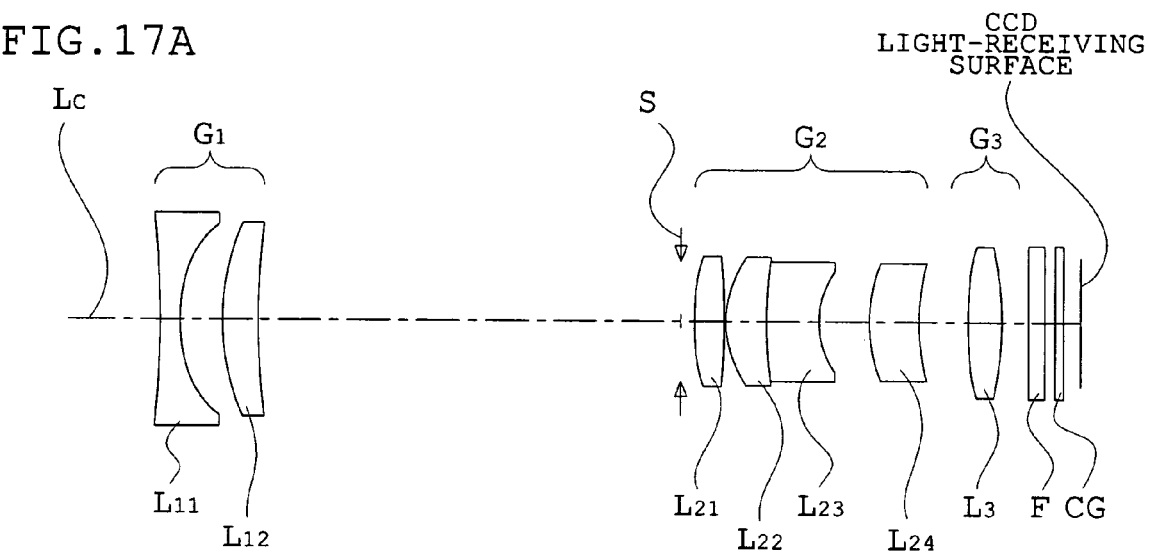
FIGS. 17A, 17B, and 17C are sectional views showing optical arrangements, developed along the optical axis, at wide-angle, middle, and telephoto positions, respectively, of the zoom lens in a ninth embodiment of the present invention.
Figure 17B:
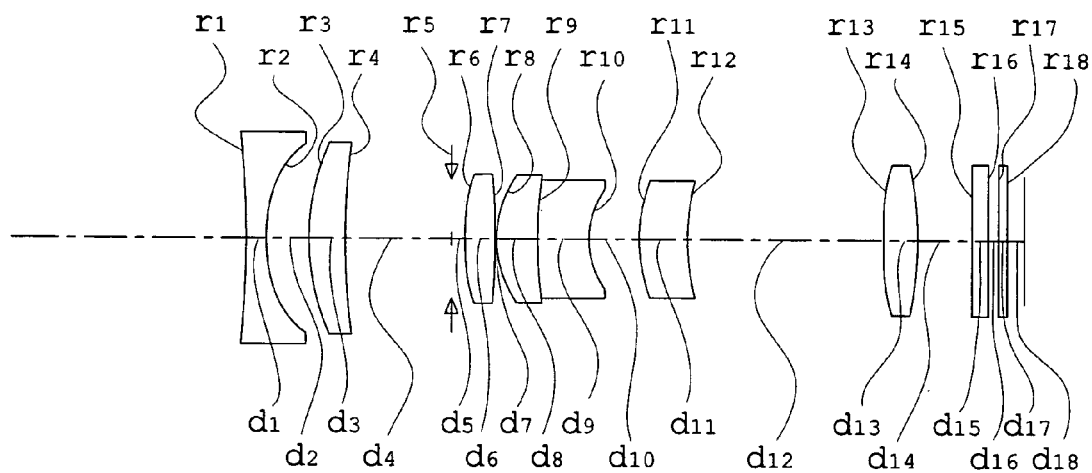
Figure 17C:
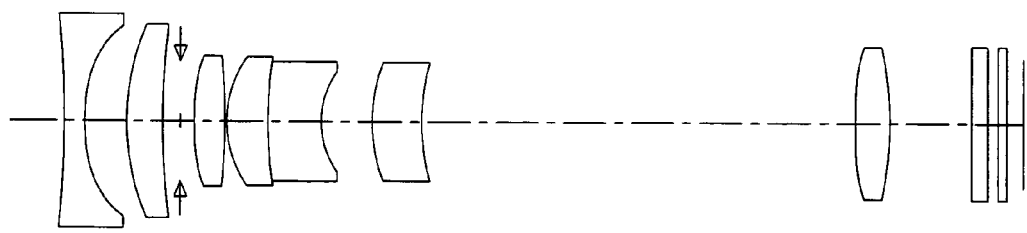
Figure 18A:
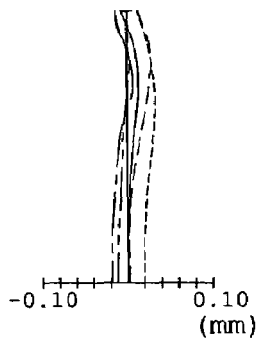
FIGS. 18A, 18B, 18C, and 18D are diagrams showing aberration characteristics at the wide-angle position of the zoom lens in the ninth embodiment.
Figure 18B:
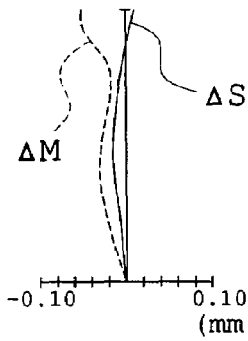
Figure 18C:
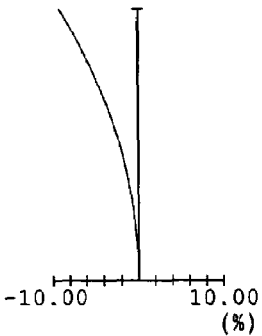
Figure 18D:
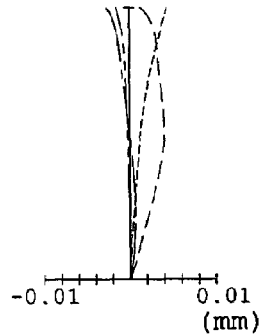
Figure 18E:
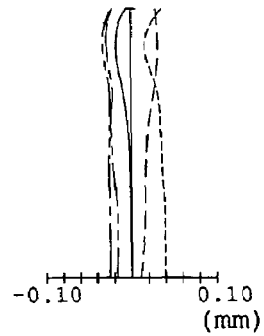
FIGS. 18E, 18F, 18G, and 18H are diagrams showing aberration characteristics at the middle position of the zoom lens in the ninth embodiment.
Figure 18F:
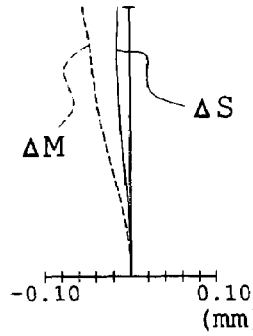
Figure 18G:
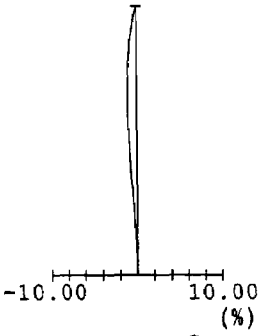
Figure 18H:
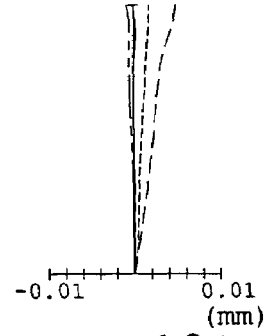
Figure 18I:
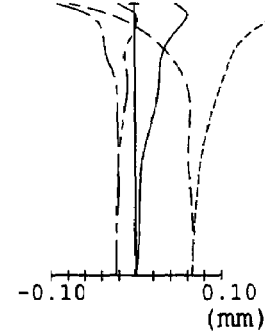
FIGS. 18I, 18J, 18K, and 18L are diagrams showing aberration characteristics at the telephoto position of the zoom lens in the ninth embodiment.
Figure 18J:
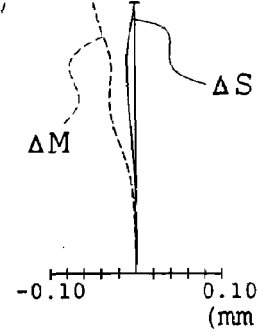
Figure 18K:
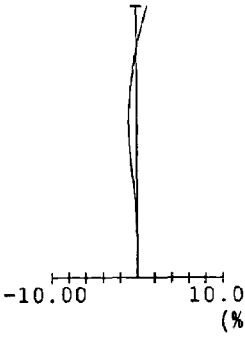
Figure 18L:
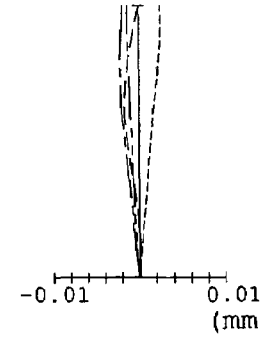

FIGS. 17A–17C show the arrangements of the zoom lens in this embodiment. FIGS. 18A–18L show aberration characteristics in the infinite object point focusing of the zoom lens of the ninth embodiment.

The zoom lens of the ninth embodiment, as shown in FIGS. 17A–17C, comprises the first lens unit $G_1$ with negative power, the second lens unit $G_2$ with positive power, and the third lens unit $G_3$ with positive power. The first lens unit $G_1$ includes the negative lens $L_{11}$ with a concave surface of strong curvature facing the image side and the positive lens $L_{12}$. The second lens unit $G_2$ includes the positive lens $L_{21}$, the cemented lens component of the positive lens $L_{22}$ and the negative lens $L_{23}$, arrange in this order, and the positive lens $L_{24}$. The third lens unit $G_3$ is constructed with the single positive lens component $L_3$. The first lens unit $G_1$, the second lens unit $G_2$, and the third lens unit $G_3$ can be moved independently along the optical axis $L_C$. Again, reference symbol S represents a stop and F represents filters such as an optical low-pass filter and an infrared cutoff filter. Reference symbol CG denotes a cover glass for an electronic image sensor such as a CCD or CMOS. In the zoom lens of the ninth embodiment constructed as mentioned above, the first lens unit $G_1$, the second lens unit $G_2$, and the third lens unit $G_3$ are moved along the optical axis $L_C$ and thereby the magnification change is carried out.

Subsequently, numerical data of lenses constituting the zoom lens in the ninth embodiment are shown below.

| Surface | RDY | THI | Nd | Vd |
|---|---|---|---|---|
| 1 | −62.1415 | 1.2000 | 1.76800 | 49.24 |
| 2$ | 7.5461 | 2.5000 | 1 | |
| 3 | 14.4687 | 2.1342 | 1.84666 | 23.78 |
| 4 | 45.8608 | D4 | 1 | |
| Stop | ∞ | 0.8000 | 1 | |
| 6$ | 13.3314 | 1.7940 | 1.69350 | 53.20 |
| 7$ | −98.1277 | 0.1000 | 1 | |
| 8 | 6.7335 | 2.4500 | 1.48749 | 70.23 |
| 9 | 27.0240 | 3.1000 | 1.84666 | 23.78 |
| 10 | 5.2131 | 3.0000 | 1 | |
| 11 | 9.5989 | 2.9000 | 1.80610 | 40.73 |
| 12$ | 16.2830 | D12 | 1 | |
| 13$ | 26.0807 | 2.0003 | 1.58313 | 59.46 |
| 14$ | −46.0797 | D14 | 1 | |
| 15 | ∞ | 0.9500 | 1.54771 | 62.84 |
| 16 | ∞ | 0.6000 | 1 | |
| 17 | ∞ | 0.5000 | 1.51633 | 64.14 |
| 18 | ∞ | | | |

Aspherical coefficients

| Surface | RDY | K |
|---|---|---|
| 2 | 7.5461 | −0.2100 |

| $A_4$ | $A_6$ | $A_8$ | $A_{10}$ |
|---|---|---|---|
| −2.0591E−4 | 2.8062E−7 | −7.7952E−8 | 4.6987E−10 |

-continued

| Surface | RDY | K |
|---------|-----|---|
| 6 | 13.3314 | −14.9562 |

| $A_4$ | $A_6$ | $A_8$ | $A_{10}$ |
|-------|-------|-------|----------|
| 9.9172E−4 | −2.3288E−5 | 1.0086E−6 | 1.1548E−8 |

| Surface | RDY | K |
|---------|-----|---|
| 7 | −98.1277 | −0.1019 |

| $A_4$ | $A_6$ | $A_8$ | $A_{10}$ |
|-------|-------|-------|----------|
| 3.0519E−4 | 4.6409E−6 | 4.5398E−8 | 4.4918E−8 |

| Surface | RDY | K |
|---------|-----|---|
| 12 | 16.2830 | 0 |

| $A_4$ | $A_6$ | $A_8$ | $A_{10}$ |
|-------|-------|-------|----------|
| 7.7905E−5 | 1.3463E−5 | −1.1244E−6 | 4.2406E−8 |

| Surface | RDY | K |
|---------|-----|---|
| 13 | 26.0807 | 0 |

| $A_4$ | $A_6$ | $A_8$ | $A_{10}$ |
|-------|-------|-------|----------|
| −1.4391E−3 | 6.6890E−5 | −6.2325E−7 | 9.6776E−9 |

| Surface | RDY | K |
|---------|-----|---|
| 14 | −46.0797 | 0 |

| $A_4$ | $A_6$ | $A_8$ | $A_{10}$ |
|-------|-------|-------|----------|
| −1.7633E−3 | 9.7837E−5 | −2.0179E−6 | 4.4536E−8 |

Zoom data

| | Wide-angle | Middle | Telephoto |
|---|---|---|---|
| Focal length | 6.12 | 16.0 | 29.4 |
| FNO | 2.65 | 4.12 | 6.18 |
| D4 | 25.05 | 6.31 | 1.20 |
| D12 | 2.84 | 11.77 | 26.68 |
| D14 | 1.55 | 3.35 | 5.09 |

$: Aspherical surface

Also, in the data of the above conditions, $|\beta 2T|=2.65$, $|f1|/fT=0.53$, $f3/fT=0.98$, and $|v_{22}-v_{23}|=46.45$.

The zoom lens of the present invention described above can be used in a photographing apparatus in which an object image is formed and is received by a solid-state image sensor, such as a CCD, and thereby photographing is performed, notably in a camera. Further, it is possible that the zoom lens is used as an observation apparatus observing the object image through an eyepiece, notably as an objective optical system of a finder section of the camera. Aspects of the zoom lens mentioned above will be illustrated below.

Figure 19:
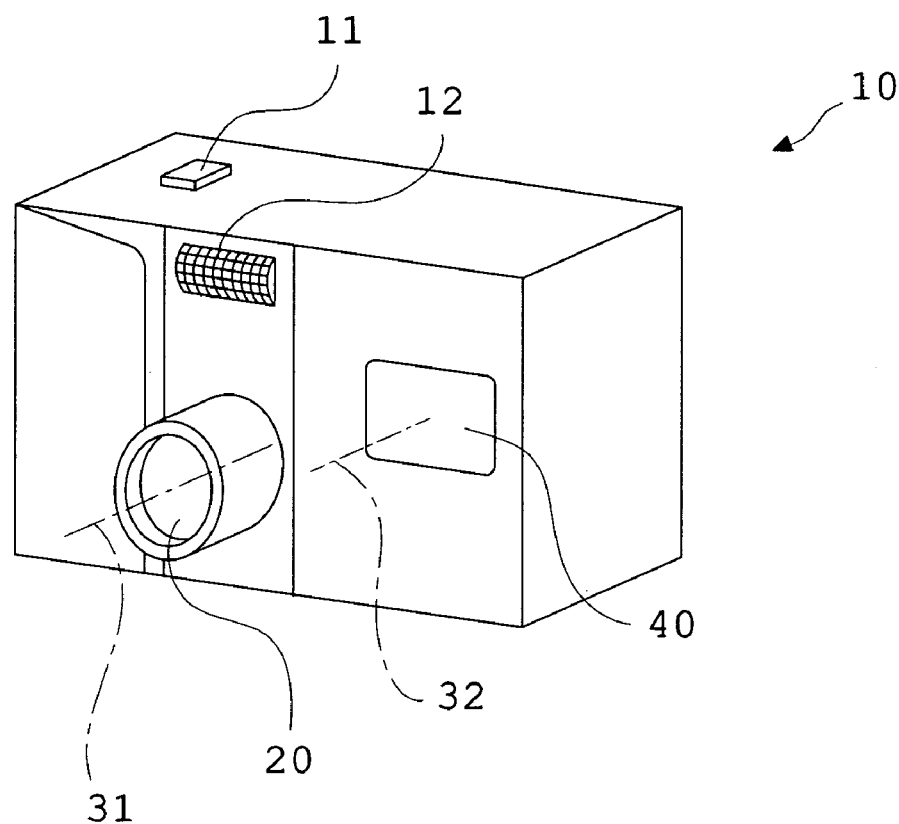
FIG. 19 is a front perspective view showing the appearance of an electronic camera applying the optical system of the present invention.
Figure 20:
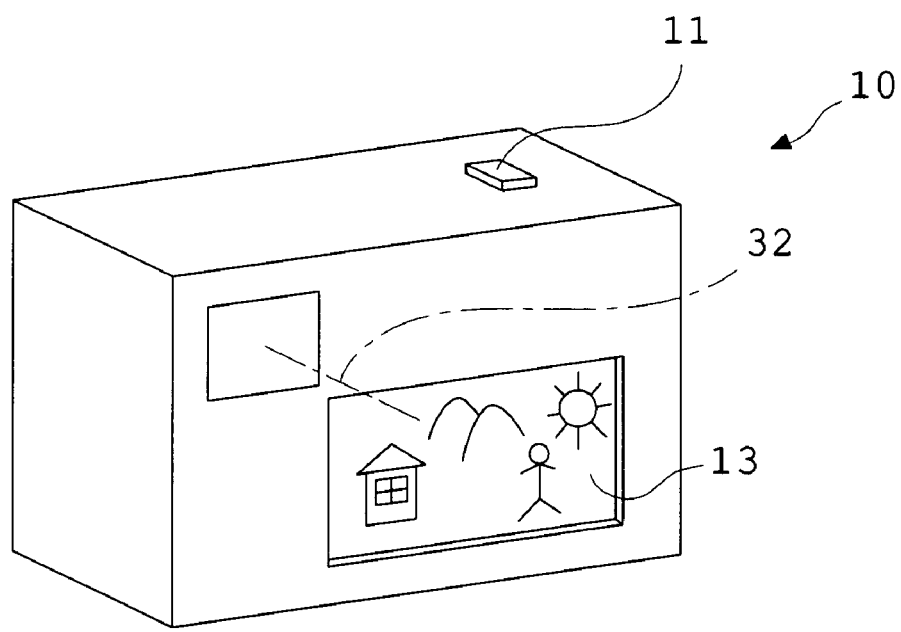
FIG. 20 is a rear perspective view showing the electronic camera of FIG. 19.
Figure 21:
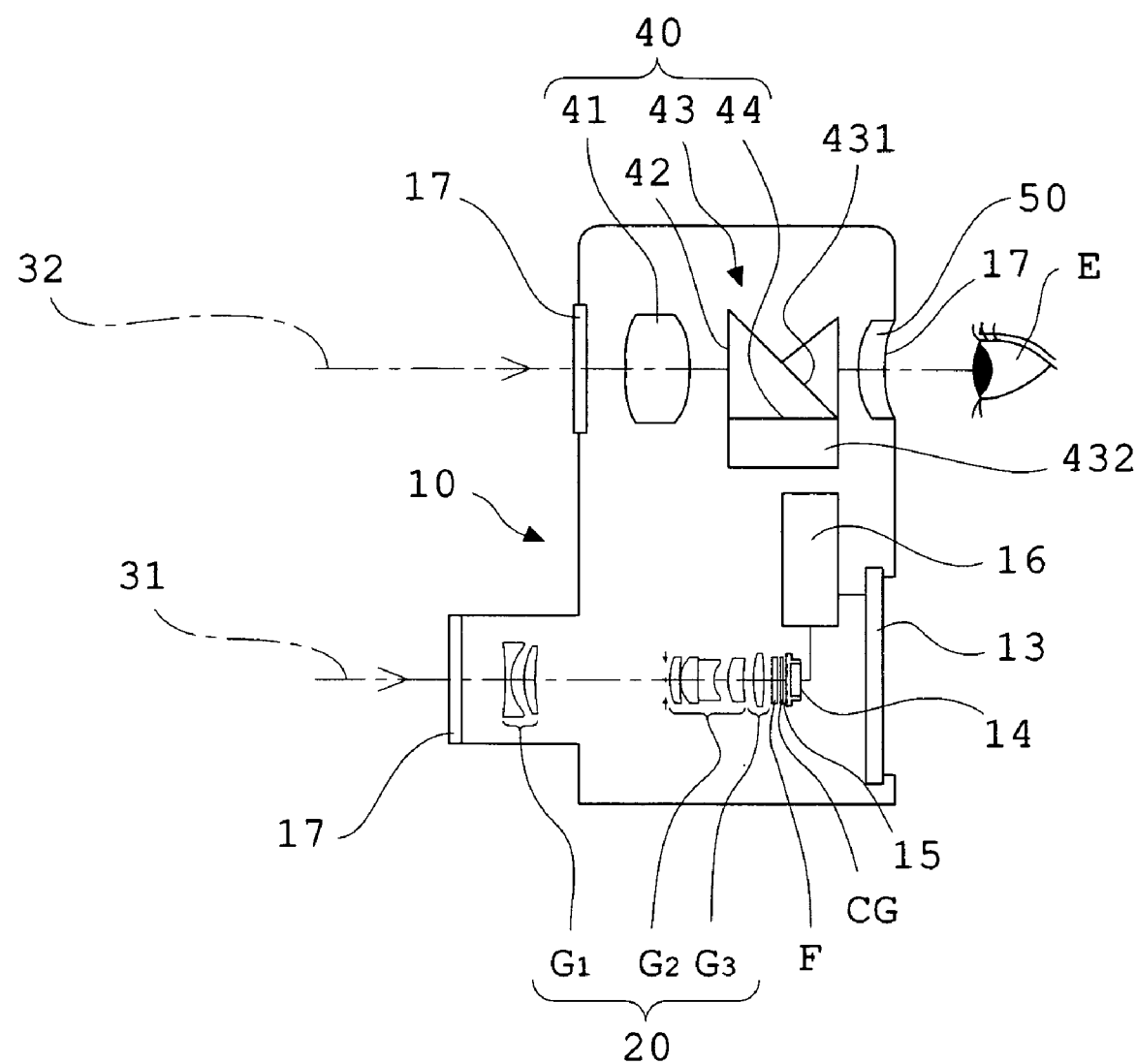
FIG. 21 is a sectional view showing the structure of the electronic camera of FIG. 19.

FIGS. 19–21 show the construction where the zoom lens of the present invention is incorporated in the photographing optical system of an electronic camera. An electronic camera 10, in this example, includes a photographing optical system 20 constructed as in the first embodiment of the present invention, having a photographing optical path 31; a finder optical system 40 having a finder optical path 32; a shutter 11; a flash lamp 12; and a liquid crystal display monitor 13. When the shutter 11 provided on the upper portion of the camera 10 is pushed, photographing is performed through the photographing optical system 20 in association with the shutter 11. An object image produced by the photographing optical system 20 is formed on an imaging surface 15 of a CCD 14 through the filters F such as the low-pass filter and the infrared cutoff filter. The object image received by the CCD 14 is displayed as an electronic image on the liquid crystal display monitor 13 provided on the backside of the camera through a processing means 16. A memory can also be provided in the processing means 16 to record a photographed electronic image. Also, the memory may be provided to be independent of the processing means 16, or may be constructed so that the image is electronically recorded and written, for example, by a floppy (trademark) disk. The camera may be constructed as a film camera using a silver halide film instead of the CCD 14.

A finder objective optical system 41 is located on the finder optical path 32. An object image produced on an imaging plane 42 of the finder objective optical system 41 is formed on a field frame 44 through a Porro prism 43 that is an image erecting member. The field frame 44 is interposed between a first reflecting surface 431 and a second reflecting surface 432 in the Porro prism 43. Behind the Porro prism 43 is located an eyepiece optical system 50 that introduces an erect image into an observer's eye E. Also, cover members 17 are placed on the entrance sides of the photographing optical system 20 and the finder objective optical system 41 and on the exit side of the eyepiece optical system 50.

In the camera 10 constructed as mentioned above, the photographing optical system 20 has a high variable magnification ratio and is the zoom lens favorably corrected for aberration. Consequently, since high performance is obtained and the photographing optical system 20 can be constructed with a small number of optical members, a compact and low-cost design can be attained.

Also, in FIG. 21, plane-parallel plates are placed as the cover members 17, but instead of them, lenses with power may be used.

Figure 22:
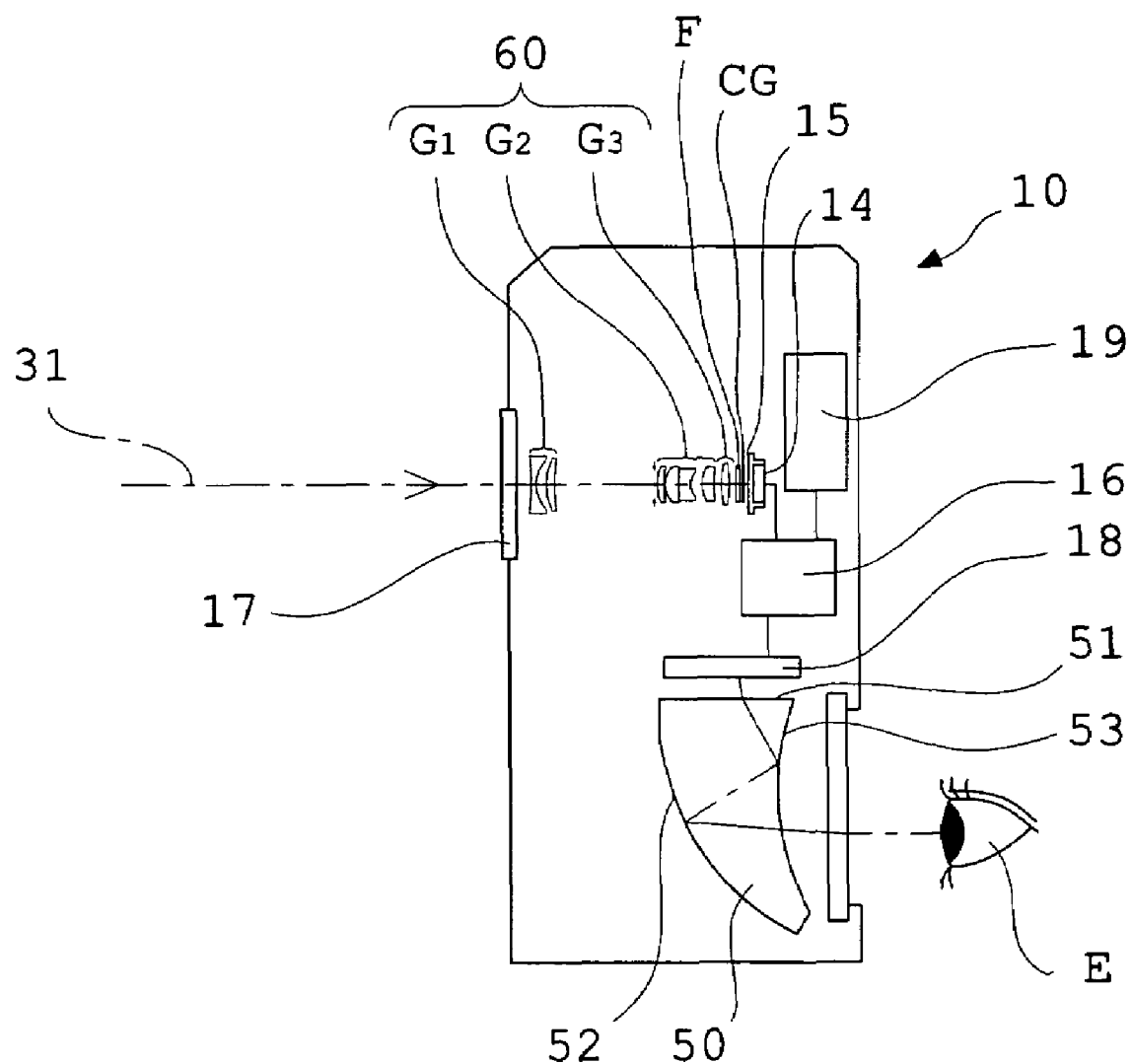
FIG. 22 is a conceptual view showing another electronic camera applying the optical system of the present invention.

FIG. 22 shows the construction where the zoom lens of the present invention is incorporated in a photographing objective optical system 60 that is the photographing section of the electronic camera 10. In this construction, the zoom lens of the present invention is used in the photographing objective optical system 60 located on the photographing optical path 31. An object image produced by the photographing objective optical system 60 is formed on the imaging surface 15 of the CCD 14 through the filters F such as the low-pass filter and the infrared cutoff filter. The object image received by the CCD 14 is displayed as the electronic image on an LCD (a liquid crystal display) 18 through the processing means 16. This processing means 16 also controls a recording means 19 recording the object image photographed by the CCD 14 as electronic information. The object image displayed on the LCD 18 is introduced into the observer's eye E through the eyepiece optical system 50. The eyepiece optical system 50 is constructed with a decentered prism and in this example, includes three surfaces: an entrance surface 51, a reflecting surface 52, and a combined surface 53 of reflection and refraction. At least one of the reflection surface 52 having the reflecting function and the combined surface 53 of reflection and refraction, preferably both, provide power to a light beam and each of them is configured as a plane-symmetrical free-formed surface that is only one symmetrical surface correcting decentration aberration.

In the camera 10 constructed as mentioned above, the photographing objective optical system 60 has a high variable magnification ratio and is a variable magnification optical system favorably corrected for aberration. Consequently, since high performance is obtained and the photographing objective optical system 60 can be constructed with a small number of optical members, a compact and low-cost design can be attained.

Also, in this example, the plane-parallel plate is placed as the cover member 17 of the photographing objective optical system 60, but as in the above example, a lens with power may be used.

Here, without providing the cover member, the most object-side surface of the zoom lens of the present invention can also be used as the cover member. In the example, the most object-side surface corresponds to the entrance surface of the first lens unit $G_1$.

What is claimed is:

1. A zoom lens comprising, in order from an object side toward an image side:
    a first lens unit with negative refracting power as a whole, consisting of, in order from the object side toward the image side:
    a negative lens; and
    a positive lens;
    a second lens unit with positive refracting power as a whole, comprising, in order from the object side toward the image side:
    a positive lens; and
    a cemented lens component comprising, in order from the object side toward the image side:
        a positive lens; and
        a negative lens; and
    a third lens unit consisting of a single positive lens component, wherein an image-side surface of the negative lens of the first lens unit is configured as a concave surface so that an absolute value of power of the concave surface is larger than the absolute value of power of an object-side surface of the negative lens, the first lens unit has at least one aspherical surface, and the second lens unit is constructed so that at least two surfaces, excluding a cemented surface between the positive lens and the negative lens constituting the cemented lens component, are aspherical, and
    wherein when a magnification of the zoom lens is changed in a range from a wide-angle position to a telephoto position in infinite object point focusing, spacing between the first lens unit and the second lens unit is narrowed and spacing between the second lens unit and the third lens unit is widened, and the zoom lens satisfies the following condition:

$$2.1 < |\beta 2T| < 2.8$$

where $\beta 2T$ is a magnification of the whole of the second lens unit at the telephoto position in the infinite object point focusing.

2. A zoom lens according to claim 1, further satisfying the following condition:

$$0.4 < |f1|/fT < 0.7$$

where f1 is a focal length of the first lens unit and fT is a focal length of an entire system of the zoom lens at the telephoto position.

3. A zoom lens according to claim 1, wherein the image-side surface of the negative lens of the first lens unit is aspherical.

4. A zoom lens according to claim 1, wherein object-side and image-side surfaces of the positive lens located on the object side in the second lens unit are aspherical.

5. A zoom lens according to claim 1, further satisfying the following condition:

$$0.7 < f3/fT < 1.2$$

where f3 is a focal length of the third lens unit and fT is a focal length of an entire system of the zoom lens at the telephoto position.

6. A zoom lens according to claim 1, further satisfying the following condition:

$$20 < |v_{22} - v_{23}|$$

where $v_{22}$ is an Abbe's number of the positive lens contained in the cemented lens component of the second lens unit and $v_{23}$ is an Abbe's number of the negative lens contained in the cemented lens component of the second lens unit.

7. A zoom lens according to claim 1, wherein entrance and exit surfaces of the positive lens component constituting the third lens unit that come in contact with air are both aspherical.

8. A zoom lens according to claim 1, wherein the second lens unit consists of, in order from the object side toward the image side: the positive lens; the cemented lens component consisting of the positive lens and the negative lens; and a positive lens.

9. A zoom lens according to claim 1, wherein the third lens unit consists of a single positive lens.

10. A zoom lens according to claim 1, wherein the zoom lens further comprises a stop, the stop being interposed between the first lens unit and the second lens unit and moved integrally with the second lens unit when the magnification is changed in the range from the wide-angle position to the telephoto position.

11. An imaging apparatus comprising:
    a zoom lens according to claim 1; and
    an electronic image sensor placed on the image side of the zoom lens.

12. A zoom lens according to claim 2, wherein the image-side surface of the negative lens of the first lens unit is aspherical.

13. A zoom lens according to claim 2, wherein object-side and image-side surfaces of the positive lens located on the object side in the second lens unit are aspherical.

14. A zoom lens according to claim 2, further satisfying the following condition:

$$0.7 < f3/fT < 1.2$$

where f3 is a focal length of the third lens unit and fT is a focal length of an entire system of the zoom lens at the telephoto position.

15. A zoom lens according to claim 2, further satisfying the following condition:

$$20 < |v_{22} - v_{23}|$$

where $v_{22}$ is an Abbe's number of the positive lens contained in the cemented lens component of the second lens unit and $v_{23}$ is an Abbe's number of the negative lens contained in the cemented lens component of the second lens unit.

16. A zoom lens according to claim 2, wherein entrance and exit surfaces of the positive lens component constituting the third lens unit that come in contact with air are both aspherical.

17. A zoom lens according to claim 2, wherein the second lens unit consists of, in order from the object side toward the image side: the positive lens; the cemented lens component consisting of the positive lens and the negative lens; and a positive lens.

18. A zoom lens according to claim 2, wherein the third lens unit consists of a single positive lens.

19. A zoom lens according to claim 2, wherein the zoom lens further comprises a stop, the stop being interposed between the first lens unit and the second lens unit and moved integrally with the second lens unit when the magnification is changed in the range from the wide-angle position to the telephoto position.

* * * * *